United States Patent
Patel et al.

(10) Patent No.: US 10,268,755 B2
(45) Date of Patent: Apr. 23, 2019

(54) SYSTEMS AND METHODS FOR PROVIDING DYNAMIC INDEXER DISCOVERY

(71) Applicant: Splunk Inc., San Francisco, CA (US)

(72) Inventors: Vishal Patel, San Francisco, CA (US);
Jagannath Kerai, Cupertino, CA (US);
Hasan Alayli, San Francisco, CA (US)

(73) Assignee: Splunk Inc., San Francisco, CA (US)

( * ) Notice: Subject to any disclaimer, the term of this patent is extended or adjusted under 35 U.S.C. 154(b) by 722 days.

(21) Appl. No.: 14/700,844

(22) Filed: Apr. 30, 2015

(65) Prior Publication Data

US 2016/0321352 A1    Nov. 3, 2016

(51) Int. Cl.
*G06F 17/30* (2006.01)

(52) U.S. Cl.
CPC .. *G06F 17/30631* (2013.01); *G06F 17/30144* (2013.01)

(58) Field of Classification Search
None
See application file for complete search history.

(56) References Cited

U.S. PATENT DOCUMENTS

| | | | | |
|---|---|---|---|---|
| 7,979,439 B1* | 7/2011 | Nordstrom | ........ | G06F 17/30312 707/741 |
| 8,296,419 B1* | 10/2012 | Khanna | ................. | G06F 9/5072 709/201 |
| 8,949,308 B2* | 2/2015 | Chintalapati | ......... | G06F 9/5072 709/201 |
| 9,128,899 B1* | 9/2015 | McAlister | ............. | G06F 11/203 |
| 9,378,067 B1* | 6/2016 | Agarwala | ............. | G06F 9/5088 |
| 9,514,162 B2* | 12/2016 | Bertram | ............ | G06F 17/30289 |
| 9,607,001 B2* | 3/2017 | Borthakur | ......... | G06F 17/30194 |
| 9,727,590 B2* | 8/2017 | Gajic | ................ | G06F 17/30289 |
| 2008/0077635 A1* | 3/2008 | Sporny | ............. | G06F 17/30206 |
| 2008/0256079 A1* | 10/2008 | Saha | ................... | H04L 41/0806 |
| 2012/0197856 A1* | 8/2012 | Banka | ..................... | H04L 67/12 707/706 |
| 2012/0197898 A1* | 8/2012 | Pandey | ............. | G06F 17/30333 707/741 |
| 2012/0197911 A1* | 8/2012 | Banka | ............... | G06F 17/30864 707/752 |
| 2014/0006846 A1* | 1/2014 | Wang | ................... | G06F 11/2025 714/4.11 |

(Continued)

OTHER PUBLICATIONS

Ergenekon, Emre and Eriksson, Petter, Big Data Archiving with Splunk and Hadoop, Masters Thesis, 2013.*

(Continued)

*Primary Examiner* — Jeff A Burke

(57) ABSTRACT

The present disclosure is directed to providing dynamic indexer discovery. An index manager, which may also be known as a cluster master, is configured to track the statuses and capabilities of indexers and provide the statuses and capabilities obtained from the indexers to data collectors, such as forwarders. The data collectors may use the statuses and capabilities associated with the indexers to load balance transmission of data to the indexers. Dynamic indexer discovery may eliminate the need to manually reconfigure data collectors when the status of an indexer changes because the information may be obtained from the index manager without the need to reinitialize the data collectors.

30 Claims, 19 Drawing Sheets

(56) References Cited

U.S. PATENT DOCUMENTS

| | | | |
|---|---|---|---|
| 2015/0286684 A1* | 10/2015 | Heinz | G06F 11/3476 707/769 |
| 2016/0103692 A1* | 4/2016 | Guntaka | G06F 8/35 713/2 |
| 2016/0182652 A1* | 6/2016 | Bevilacqua | G06F 8/34 709/203 |
| 2016/0188594 A1* | 6/2016 | Ranganathan | G06F 17/3048 707/769 |
| 2016/0188689 A1* | 6/2016 | Singh | G06F 17/30575 707/610 |

OTHER PUBLICATIONS

HUnk: Splunk Analytics for Hadoop Intro—Part 2, published Jul. 7, 2013, retreived at https://www.splunk.com/blog/2013/07/07/hunk-intro-part-2.html.*

Bitincka, Dritan, Architecting Splunk for High Availability and Disaster Recovery, published 2014.*

Congnitive Splunking, Published Sep. 17, 2012, retrieved at https://www.splunk.com/blog/2012/09/17/cognitive-splunking.html.*

* cited by examiner

| IP Address | Port | SSL Enabled? | Storage Capacity | Average Load (CPU) | Average Load (Memory) |
|---|---|---|---|---|---|
| IP Address 1 | Port 1 | Yes | Storage Capacity 1 | | |
| IP Address 2 | Port 2 | No | Storage Capacity 2 | | |
| ... | ... | ... | ... | ... | ... |
| IP Address N | Port N | No | Storage Capacity N | | |

Original Search: 1501
search "error" | stats count BY host

Sent to peers: 1502
search "error" | prestats count BY host(map)

Executed by search head: 1503
Merge prestats results received from peers (reduce)

SYSTEMS AND METHODS FOR PROVIDING DYNAMIC INDEXER DISCOVERY

TECHNICAL FIELD

The present disclosure is generally directed to data management, and more particularly, to systems and methods for providing dynamic indexer discovery.

BACKGROUND

Data centers often comprise thousands of hosts that operate collectively to service requests from an even larger numbers of remote clients. The components of the data centers may generate an extensive volume of unstructured machine-generated data, such as activity logs, error logs, configuration files, network messages, database records, and the like. Unfortunately, the unstructured nature of the generated data makes it challenging to perform indexing and searching operations due to the difficulty of applying semantic meaning to unstructured data. The ever-increasing volume of machine-generated data may increase the burden on the components of the data centers, such as data collectors and indexers, which in turn may cause the data centers to become inefficient.

BRIEF DESCRIPTION OF THE DRAWINGS

FIG. 2B illustrates an example status indication for dynamic indexer discovery in accordance with the disclosed embodiments.

FIG. 9 illustrates an example search query received from a client and executed by search peers in accordance with the disclosed embodiments.

FIG. 10B illustrates an example data summary dialog that enables a user to select various data sources in accordance with the disclosed embodiments.

DETAILED DESCRIPTION

Figure 1:
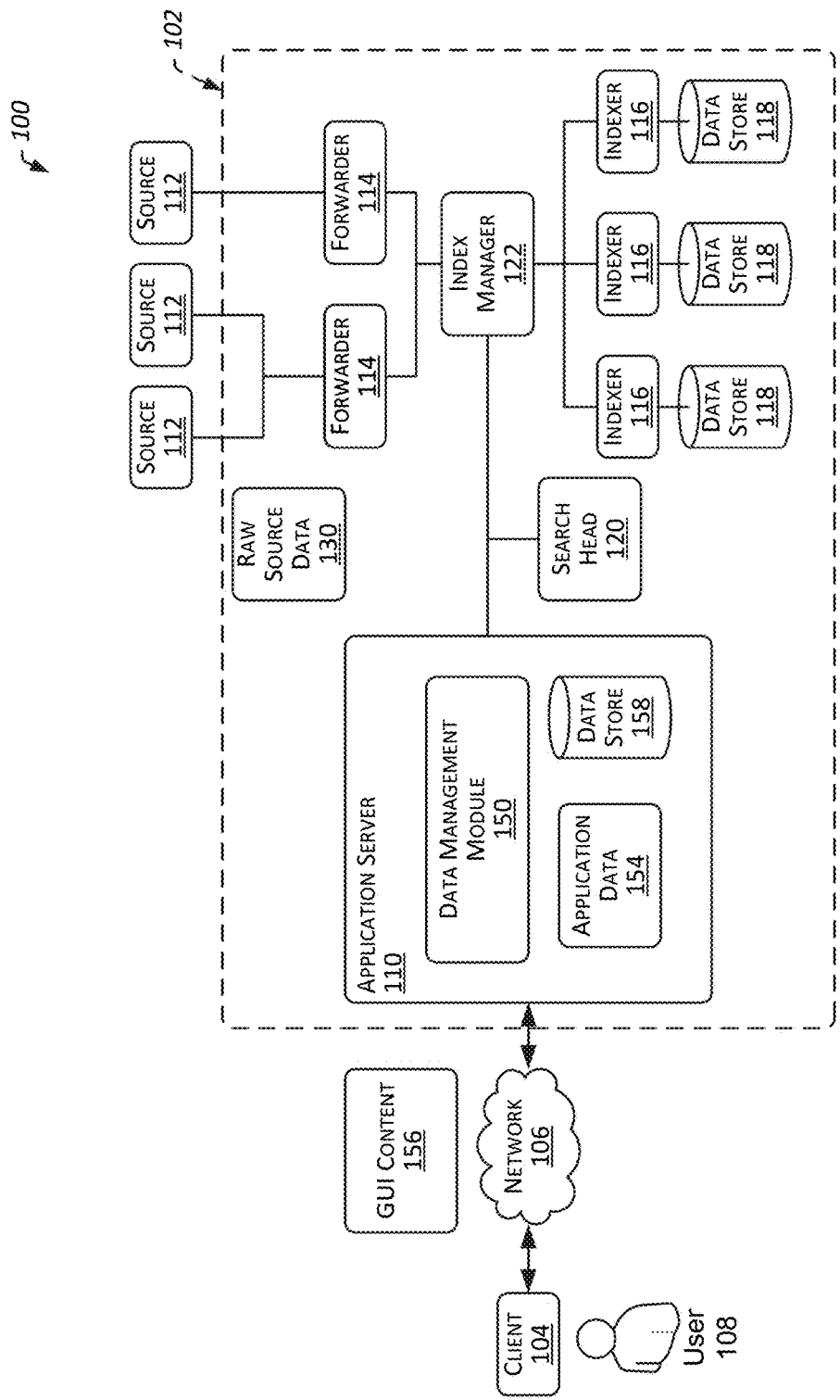
FIG. 1 illustrates an example data processing environment in accordance with the disclosed embodiments.

Throughout this description for the purposes of explanation, numerous specific details are set forth in order to provide a thorough understanding of the present disclosure. It will be apparent, however, to one skilled in the art that the present disclosure may be practiced without some of these specific details. In other instances, well-known structures and devices are shown in block diagram form to avoid obscuring the underlying principles of the described embodiments.

The present disclosure is directed to providing dynamic indexer discovery. In a modern data center, when a new component, such as an indexer is added to an existing configuration, a manual update may be required to update data collectors of the addition of the new indexer before the data collectors can begin transmitting data to the new component for processing. An example of a data collector is a forwarder. A forwarder is a device that may obtain information from one or more sources and forwards the information to one or more indexers for processing. As used herein, the terms "data collector" and "forwarder" may be used interchangeably, though a forwarder is a type of data collector. An index manager, which may also be known as a cluster master, may be responsible for tracking the statuses and capabilities of indexers. In some embodiments, the index manager may be responsible for transmitting notification of status updates to the data collectors, In some embodiments, the data collectors may be responsible for requesting updates from the index manager for the status indication of active indexers.

In some embodiments, the data collectors (e.g., forwarders) may transmit periodic requests to the index manager (e.g., cluster master) to determine whether any new indexers have been added or deleted, and based on the response, the data collector may update its own list of indexers with the updated indication from the index manager. Additionally, because the index manager becomes quickly aware of any inactive indexer, when a data collector transmits a request to the index manager, the index manager can update the list of available indexers maintained by the data collector accordingly so that data will not be sent to an inactive or otherwise unavailable indexer. In some embodiments, dynamic indexer discovery enables data collectors to receive updates of changes in the data center configuration without needing to be reinitialized (e.g., rebooted, restarted, etc.) whenever a status indication is updated.

In some embodiments, the index manager may track or otherwise maintain knowledge or information associated with the performance metrics associated with indexers (e.g., storage and/or processing capabilities of the respective indexers) and may provide the knowledge, information, and performance metrics to the data collectors when transmitting the status indications to the data collectors. The data collectors may use the received performance metrics to adjust how they load-balance data to the respective indexers rather than forwarding equal amounts of data to all indexers.

In some embodiments, an index manager may instruct associated data collectors to request status updates at periodic time intervals and/or at pre-determined times to avoid having some or all the data collectors requesting information at the same time. In some embodiments, the index manager may track or otherwise maintain knowledge associated with the capacity and/or efficiency of all indexers and may transfer such data to the forwarders so the forwarders can more efficiently load balance the data among the active indexers based on the respective capacities of the indexers.

In some embodiments, the search head or application server may utilize the time-stamped machine-generated data processed by the one or more indexers, such as, for example, searches. Example searches of machine-generated data that is processed by indexers, including searches employing late binding schema, are described in more detail below with regard to at least FIGS. 5-11D. In the context of machine-generated data, data sources can include, for example, applications, application servers, web servers, databases, networks, virtual machines, telecom equipment, operating systems, sensors, and/or the like. Although certain data sources are described herein for the purpose of illustration, embodiments can include any variety of data sources. Some example of data sources are described in more detail below with regard to at least FIGS. 5-11D.

Turning now to the figures, FIG. 1 illustrates an example data processing environment ("environment") 100 in accordance with the disclosed embodiments. In some embodiments, the environment 100 can include an event-processing system ("system") 102 communicatively coupled to one or more client devices 104 via a communications network 106. The client device 104 may be used or otherwise accessed by a user 108, such as a system administrator or a customer.

In some embodiments, the system 102 can include an application server 110, one or more data sources ("sources") 112, one or more forwarders 114, one or more indexers 116, one or more index data stores 118, one or more index managers 122, and/or one or more search heads 120. In some embodiments, machine-generated data may include raw data files that may include raw source data in compressed form.

The network 106 may include an element or system that facilitates communication between the entities of the environment 100 (e.g., including the application server 110 and the client devices 104). The network 106 may include an electronic communications network, such as the Internet, a local area network (LAN), a wide area network (WAN), a wireless local area network (WLAN), a cellular communications network, and/or the like. In some embodiments, the network 106 can include a wired or a wireless network. In some embodiments, the network 106 can include a single network or a combination of networks.

A client device 104 may include any variety of electronic devices. In some embodiments, a client device 104 can include a device capable of communicating information via the network 106. A client device 104 may include one or more computer devices, such as a desktop computer, a server, a laptop computer, a tablet computer, a wearable computer device, a personal digital assistant (PDA), a smart phone, and/or the like. In some embodiments, a client device 104 may be a client of the application server 110. In some embodiments, a client device 104 can include various input/output (I/O) interfaces, such as a display (e.g., for displaying a graphical user interface (GUI)), an audible output user interface (e.g., a speaker), an audible input user interface (e.g., a microphone), an image acquisition interface (e.g., a camera), a keyboard, a pointer/selection device (e.g., a mouse, a trackball, a touchpad, a touchscreen, a gesture capture or detecting device, or a stylus), and/or the like. In some embodiments, a client device 104 can include general computing components and/or embedded systems optimized with specific components for performing specific tasks. In some embodiments, a client device 104 can include programs/applications that can be used to generate a request for, to provide content, to render content, and/or to send and/or receive requests to and/or from other devices via the network 106. In some embodiments, the client device 104 and the application server 110 may communicate over a network 106 to exchange GUI content 156. GUI content may include any information necessary to render a GUI on the client device 104. For example, a client device 104 may include an Internet browser application that facilitates communication with the application server 110 via the network 106. In some embodiments, a program, or application, of a client device 104 can include program modules having program instructions that are executable by a computer system to perform some or all of the functionality described herein with regard to at least client device(s) 104. In some embodiments, a client device 104 can include one or more computer systems similar to that of the computer system 1000 described below with regard to at least FIG. 4.

The application server 110 may include a computing device having network connectivity and being capable of providing one or more services to network clients, such as a client device 104. These services may include ingesting, processing, storing, monitoring, and/or searching data. Although certain embodiments are described with regard to a single server for the purpose of illustration, embodiments may include employing multiple servers, such as a plurality of distributed servers. In some embodiments, the application server 110 can include one or more computer systems similar to that of the computer system 1000 described below with regard to at least FIG. 4. In some embodiments, the application server 110 may include a data management module 150, application data 154, and/or a datastore 158. The data management module 150 may receive and maintain data received from different components of the system 100. For example, the application server 110 may receive search results from a search head 120 that may be used by one or more entities to ingest, process, store, monitor, and/or search data. In some embodiments, the data management module 150 may generate and/or update application data 154, which may be data generated by the application server 110. In some embodiments, the data that is ingested, processed, monitored, and resulting from searching may be stored in a datastore, such as datastore 158.

A data source (also referred to as a "source" or "data input") 112 may be a source of incoming source data (also referred to as "event data") 130 being fed into the system 102. A data source 112 may include one or more external data sources, such as web servers, application servers, databases, firewalls, routers, operating systems, and software applications that execute on computer systems, mobile devices, sensors, and/or the like. A data source 112 may be located remote from the system 102. For example, a data source 112 may be defined on an agent computer operating remote from the system 102, such as on-site at a customer's location that transmits source data 130 to one or more forwarders 114 via a communications network (e.g., network 106). The source data 130 can be a stream or set of data fed to an entity of the system 102, such as a forwarder 114. The source data 130 may include, for example, raw machine-generated time-series data, such as server log files, activity log files, configuration files, messages, network packet data, performance measurements, sensor measurements, and/or the like. A data source 112 may be local to (e.g., integrated with) the system 102. For example, a data source 112 may be defined on a forwarder 114. In some embodiments, the data sources 112 can be the same or similar to the data sources 1105 described below with regard to at least FIG. 5. In some embodiments, a source 112 can include one or more computer systems similar to that of the computer system 1000 described below with regard to at least FIG. 4.

A forwarder 114 may be an entity of the system 102 that forwards data to another entity of the system, such as an indexer 116, another forwarder 114, or a third-party system. A forwarder 114 may be in communication with an index manager 122 to obtain status information associated with one or more indexer(s) 116 and/or forwarder(s) 114. An entity that receives data from a forwarder 114, such as an indexer 116, may be referred to as a receiver entity. In some embodiments, the forwarders 114 can be the same or similar to the forwarders 1101 described below with regard to at least FIG. 5. In some embodiments, a forwarder 114 can include one or more computer systems similar to that of the computer system 1000 described below with regard to at least FIG. 4.

An index manager 122 may be an entity of the system 102 that receives status messages or notifications from indexers 116, generates and/or maintains a status indication for active indexers 116 of the system 102, and transmits the status indication to another entity of the system, such as one or more forwarders 114 or a third-party system. Examples of a status indication may include a status list, a status table, a status directory, a status database, or any other type of data structure or data organization element. The index manager 122 may dynamically update the status indication. For example, if an indexer 116 becomes inactive the indexer 116 may be removed from the status indication and forwarders 114 would be able to avoid sending data to the inactive indexers 116. Additionally, if an indexer 116 is newly added or otherwise becomes available for processing data, the index manager 122 may update the status indication to include the indexer 116 and the forwarders 114 may immediately begin transmitting data for processing to the indexer 116 without having to wait for a manual update to the status indication or the like. In some embodiments, the index manager 122 can include one or more computer systems similar to that of the computer system 1000 described below with regard to at least FIG. 4.

An indexer 116 may be an entity of the system 102 that indexes raw source data 130, generating events and placing the results into an index 140. An indexer 116 may perform other functions, such as data input and search management. In some instances, the forwarders 114 handle data input, and forward the source data 130 to the indexers 116 for indexing. An indexer 116 may perform searches across its own stored data (e.g., the data stored in an index data store 118 managed by the indexer 116). In some instances, a search head 120 can handle search management and coordinate searches across multiple indexers 116. In some embodiments, the indexer 116 can be the same or similar to the indexers 1102 described below with regard to at least FIG. 5. In some embodiments, an indexer 116 can include one or more computer systems similar to that of the computer system 1000 described below with regard to at least FIG. 4.

An index data store 118 may include a medium for the storage of data thereon. For example, a data store 118 may include a non-transitory computer-readable medium storing data thereon that is accessible by entities of the environment 100, such as the corresponding indexer 116. In some embodiments, each data store 118 is managed by a given indexer 116 that stores data to the data store 118 and/or performs searches of the data stored on the data store 118. Although certain embodiments are described with regard to a single data store 118 for the purpose of illustration, embodiments may include employing multiple data stores 118, such as a plurality of distributed data stores 118. In some embodiments, an index data store 118 is the same or similar to the data stores 1103 described below with regard to at least FIG. 5.

A search head 120 may be an entity of the system 102 that handles search requests and/or consolidates the search results for presentation to a user 108. In a distributed search environment (e.g., including multiple indexers 116), a search head 120 may distribute search requests across a set of indexers 116 that perform the actual searching to generate individual sets of search results, and then merge the individual sets of search results into a consolidated set of search results that are provided to the user 108. In a non-distributed search environment (e.g., including only a single indexer 116), the indexer 116 may assume the role of a search head 120 and may handle the search management, as well as the indexing and searching functions. An entity of the system 102 may function as both a search head 120 and a search peer. If an entity does only searching (and not any indexing), it is usually referred to as a dedicated search head. A search head cluster may be a group of search heads 120 that serves as a central resource for searching. In some embodiments, a search head 120 is the same or similar to the search head 1104 described below with regard to at least FIG. 5. In some embodiments, the search head 120 can include one or more computer systems similar to that of the computer system 1000 described below with regard to at least FIG. 4. In some embodiments, the search head 120 or application server may utilize the time-stamped machine-generated data processed by the one or more indexers for searches.

Figure 2A:
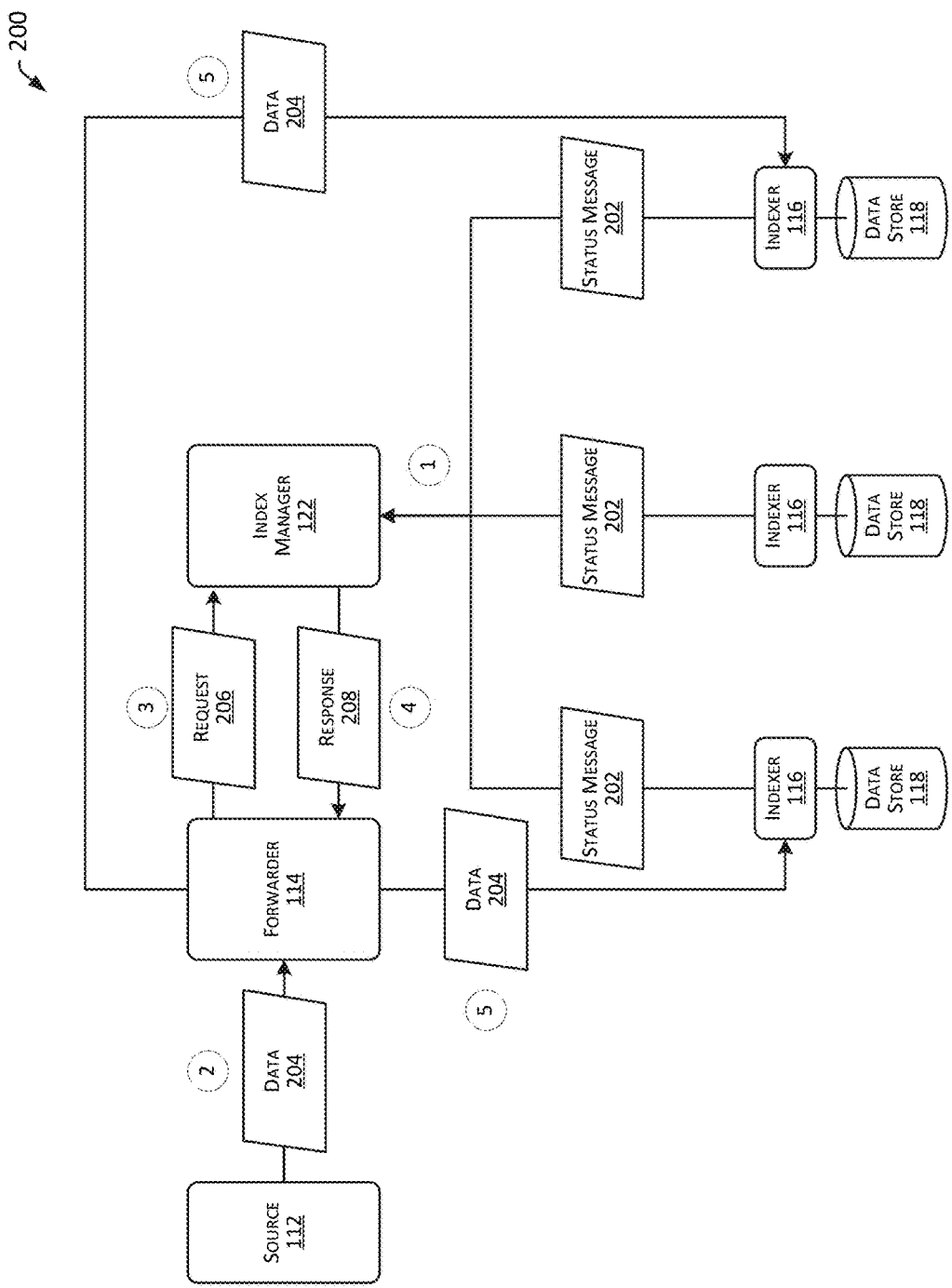
FIG. 2A illustrates an example data flow for dynamic indexer discovery in accordance with the disclosed embodiments.

FIG. 2A illustrates an example data flow 200 for dynamic indexer discovery in accordance with the disclosed embodiments. At exchange 1, one or more indexers 116 may generate and transmit a respective status message 202 to the index manager 122. In some embodiments, each indexer 116 may establish a separate connection with the index manager 122. In some embodiments, the connection between the respective indexers 116 and the index manager 122 may be a Hypertext Transfer Protocol Secure (HTTPS) connection. In some embodiments, each of the indexers 116 may transmit a status message 202 to the index manager over a respective HTTPS connection. The status message 202 transmitted from each of the indexers 116 to the index manager 122 may be in the form of a comma separated value (CSV) file or other type of text file. In some embodiments, the status message 202 may include a performance metric associated with the indexer 116. Examples of a performance metric may include, but are not limited to, storage capacity, processing capacity, network connectivity, IP address associated with the indexer, identification of a port to be used for receiving data to be processed, whether the indexer 116 is secure sockets layer (SSL) enabled, average load metrics (e.g., average CPU consumption, average memory consumption, average disk utilization, average network utilization, etc.). In some embodiments, one or more indexers 116 may use storage capacity as a performance metric. The storage capacity may be configured on each indexer 116. For example, if a server has multiple instances of an indexer 116 executing on the server, then having each of the instances use the full capacity of the server would be inaccurate. Instead, a user may designate the amount of storage capacity the indexer 116 can publish to the index manager 122 in a status message 202. In some embodiments, the storage capacity may be published as a percentage ranging from about 10-100%.

At exchange 2, a data collector, such as forwarder 114, may receive data 204 (e.g., machine-generated data) from a source 112. Sources 112 may include, but are not limited to, user devices, servers, laptops, tablets, wearable computing devices, or the like. Examples of machine-generated data 204 may include, but are not limited to, activity logs, error logs, configuration files, network messages, database records, and the like.

At exchange 3, the forwarder 114 may establish an HTTP connection with the index manager 122 and may transmit a request 206 for a status indication (e.g., status list of available indexers) over the HTTP connection. In some embodiments, the request 206 may be sent using JavaScript Object Notation (JSON) over the HTTP connection. In some embodiments, the request 206 may include two values. The first value may be a site identifier. A site identifier may be an identifier associated with a specific data center. The second value may be an identifier associated with the forwarder 114. The forwarder 114 may generate and transmit to the index manager 122 the request 206 for the status indication. Examples of a status indication may include, but are not limited to, a status list, status directory, status table, a status vector, etc.

At exchange 4, the index manager 122 may generate a response 208 to the request 206. The response 208 may include a current status indication generated by the index manager 122 based on status messages 202 received from one or more indexers 116 (e.g., at exchange 1). In some embodiments, the index manager 122 may generate a status indication specific to the requesting forwarder 114. For example, the index manager 122 may use the two values received in the request 206 to generate a forwarder-specific status indication. For example, the index manager 122 may generate a status indication including only those indexers associated with the site identifier from the request 206. In some embodiments, the index manager 122 may generate a status indication including indexers associated with the site identifier and forwarder identifier. In some embodiments, the index manager 122 may track which indexers were identified and transmitted to the forwarder 114 using the forwarder identifier. In some embodiments, the status indication may include the one or more performance metrics obtained from the indexers 116 via the one or more status messages 202. The forwarder 114 may update its own status list of indexers based on the received status indication from the index manager 122. The forwarder 114 may determine, based at least in part on the received status indication, how to allocate the machine-generated data 204 received from the source 112 (e.g., data 204 received at exchange 2).

At exchange 5, the forwarder 114 may transmit allocated portions of the data 204 to different indexers 116 based on the determination using the status indication. In some embodiments, the forwarder 114 may establish a connection with a selected indexer 116 by transmitting an initial message containing a signature. The receiving indexer 116 may validate the signature and accept the connection. If the forwarder 116 determines the signature is invalid, the forwarder may refuse the connection request. In some embodiments, the indexer 116 may validate the signature and may transmit data back to the forwarder 114. For example, the indexer 116 may indicate to the forwarder 114 that the indexer 116 is capable of supporting a new server-to-server (S2S) protocol, the indexer 116 is capable of transmitting acknowledgements, the number of channels the indexer 116 can support, whether the indexer 116 is utilizing compression, and the like.

In some embodiments, the forwarder 114 may serialize the data to be transmitted to the indexer 116. The data may then be transmitted to the indexer 116. For example, the serialized data may be transmitted using transmission control protocol (TCP). Once the indexer 116 receives the serialized data, the indexer 116 may de-serialize the data and may begin processing the data. In some embodiments, the forwarder 114 may also transmit to the indexer 116 a flush key. A flush key can be an indicator that the forwarder 114 has completed the transmission of data to the indexer 116. Once the indexer 116 receives a flush key, the indexer 116 may write everything in memory to disk, thus freeing up the memory.

Now referring to FIG. 2B, an example status indication 250 for dynamic indexer discovery is illustrated in accordance with the disclosed embodiments. The status indication may be a table, vector, or any other type of data structure that may be used to track information received from different indexers. In the example status indication 250, the status indication may track one or more IP addresses associated with an indexer 116, a port that the indexer 116 may use to receive data for processing, an indication that the indexer 116 is SSL-enabled, a storage capacity associated with the indexer 116, and an average load metric (e.g., CPU utilization, memory utilization, etc.). In some embodiments, the index manager 122 may receive data in the form of status messages 202 from one or more indexers 116. In some embodiments, the indexers 116 may only transmit a single performance metric (e.g., storage capacity). In other embodiments, the indexers 116 may transmit one or more performance metrics, which may include but are not limited to storage capacity, average CPU utilization, average memory utilization, average network utilization, average disk utilization, and/or queue statistics (e.g., number of queues, how many searches have been performed, how full the queues are, how much data the indexer has processed in an identified time period, how quickly data is being written to disk, etc.)

Figure 3A:
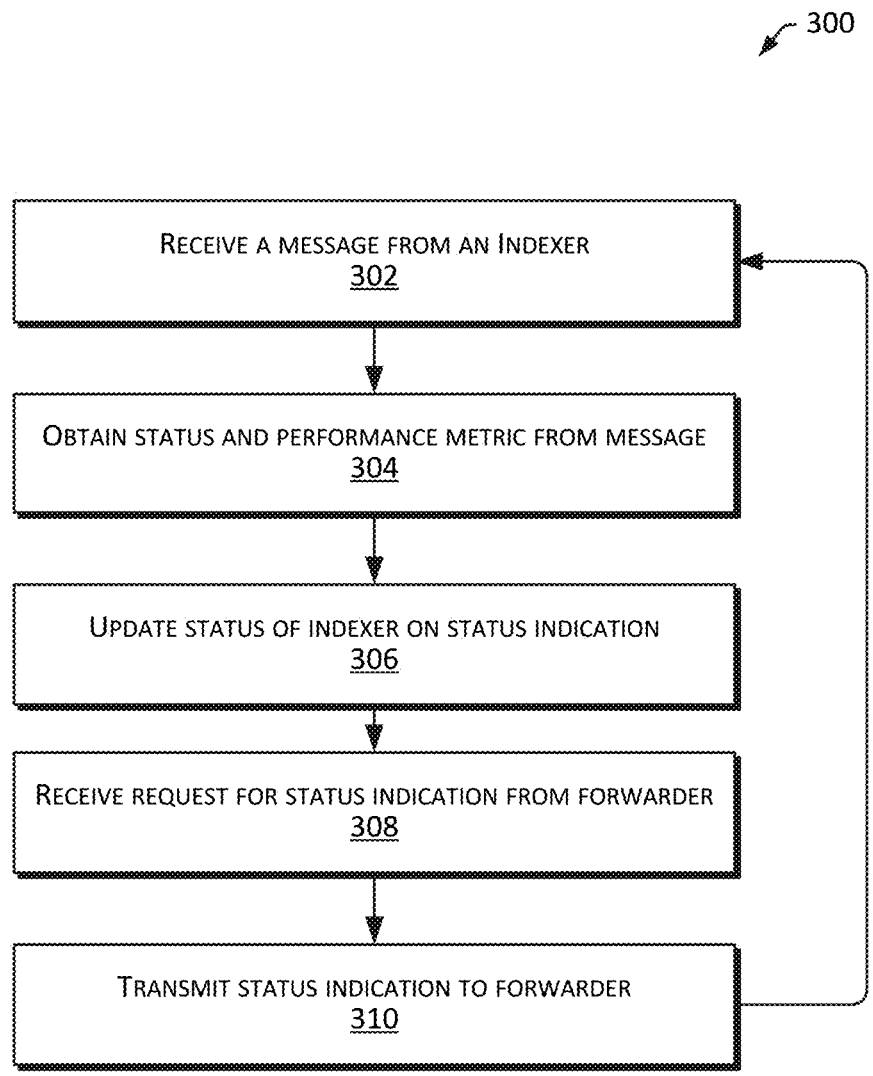
FIG. 3A is a flowchart that illustrates an example method for providing dynamic indexer discovery in accordance with the disclosed embodiments.

FIG. 3A is a flowchart that illustrates an example method 300 for providing dynamic indexer discovery in accordance with the disclosed embodiments. At block 302, an index manager 122 may receive a message, such as a status message 202, from an indexer 116. In some embodiments the status message 202 may be received over periodic time intervals. In some embodiments, the periodic time interval may be known as a heartbeat interval. In other embodiments, each indexer may be configured with a respective periodic time interval. In some embodiments, the periodic interval is manually configured. In some embodiments, if a periodic interval is not manually configured, the indexer 116 may utilize a default value designating the periodic interval. A first indexer 116 may generate and transmit a status message 202 every ten minutes, whereas a second indexer 116 may generate and transmit a status message 202 every hour. The periodic time interval may be configured for each respective indexer. In some embodiments, the status message 202 may be received at pre-determined times. For example, a first indexer 116 may generate and transmit a status message 202 at 10:00 AM, whereas a second indexer 116 may generate and transmit a status message 202 at 3:35 PM.

In some embodiments, the index manager 122 may dynamically adjust the periodic time interval or pre-determined time at which the respective indexers generate and transmit status messages 202. For example, the index manager 122 may determine that there are too many indexers transmitting status messages 202 within a time window. In response to the determination, the index manager 122 may dynamically adjust the periodic time interval or pre-determined time at which one or more indexers can transmit status messages 202 to the index manager 122.

At block 304, the index manager 122 may obtain a status associated with the indexer 116 and one or more performance metrics associated with the indexer 116 from the message. In some embodiments, the status message 202 generated by an indexer 116 may include a current status associated with the indexer 116. For example, a status may be "active" and ready to receive machine-generated data 204, active but cannot receive machine-generated data 204 until a specified time or after a specified time interval, active but unable to receive machine-generated data 204, inactive due to maintenance, inactive due to work load, or the like. A status message 202 may include one or more performance metrics associated with the indexer 116. For example, a performance metric may be disk capacity, storage capacity, processing capacity, or the like. In some embodiments, the index manager 122 may parse or otherwise analyze the status message 202 to obtain a status associated with the indexer. In some embodiments, the index manager 122 may also obtain one or more performance metrics associated with the indexer 116.

At block 306, the index manager 122 may update the status of the indexer 116 on a status indication, such as a status list, status directory, status table, or the like. In some embodiments, the index manager 122 may compare the status associated with the indexer 116 to the status indication to determine if an update needs to be made. In some embodiments, the index manager 122 may compare one or more performance metrics associated with the indexer 116 to determine if an update is appropriate. If an update is appropriate, the index manager 122 may update the status indication. In some embodiments, the status indication may be stored in a datastore, such as datastore 158 or on the index manager 122.

At block 308, the index manager 122 may receive a request from the forwarder 114 for a status indication. In some embodiments, the request may comprise an identifier associated with the forwarder 114 and an identifier associated with a site or data center location.

At block 310, the index manager 122 may transmit the status indication to the forwarder 114. In some embodiments, the index manager 122 may transmit the status indication to a data collector, such as a forwarder 114, in response to receiving a request 206. In some embodiments, the index manager 122 may transmit the status indication to one or more data collectors at pre-determined times or periodic time intervals. In some embodiments, the index manager 122 may generate a forwarder-specific status indication using the information received in the request, such as the site identifier. The forwarder-specific status indication may include indexers associated with the site identifier received in the request.

Figure 3B:
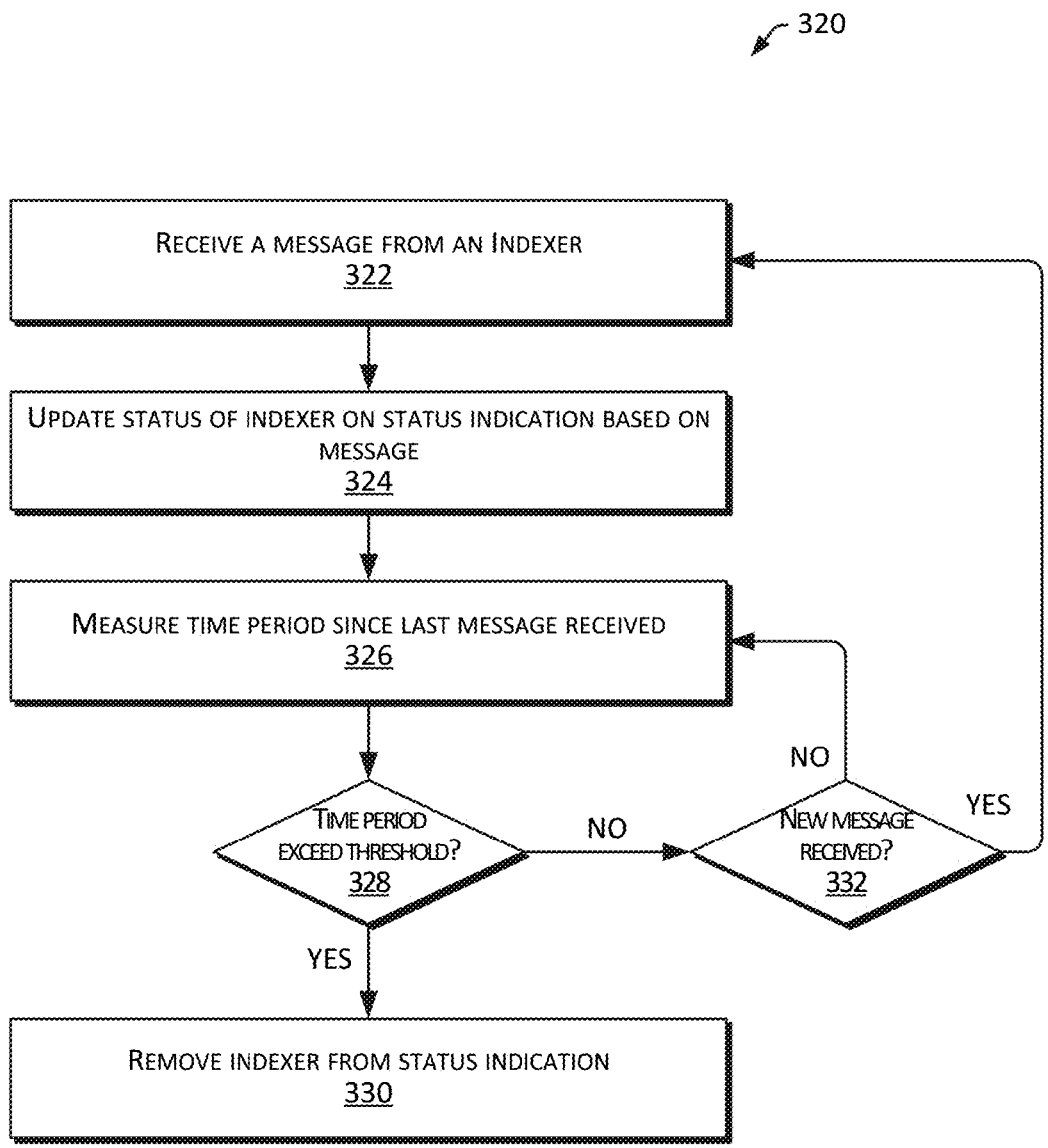
FIG. 3B is a flowchart that illustrates an example method for updating a status indication in a system providing dynamic indexer discovery in accordance with the disclosed embodiments.

FIG. 3B is a flowchart that illustrates an example method 320 for updating a status indication in a system providing dynamic indexer discovery in accordance with the disclosed embodiments. At block 322, the index manager 122 may receive a message 202 from an indexer 116. In some embodiments, the status message 202 may be received at periodic time intervals or at a pre-determined time.

At block 324, the index manager 122 may update the status of the indexer 116 on the status indication based on the status message 202. In some embodiments, the index manager 122 may compare the status associated with the indexer 116 to the status indication to determine if an update is necessary. In other embodiments, the index manager 122 may compare one or more performance metrics associated with the indexer 116 to determine if an update is appropriate. If an update is appropriate, the index manager 122 may update the status indication. In some embodiments, the status indication may be stored in a datastore, such as datastore 158 or on the index manager 122.

At block 326, the index manager 122 may determine the time period since the last message was received. For example, the index manager 122 may obtain the time the last message was received (e.g., obtaining timestamp associated with message 202).

At block 328, the index manager 122 may determine whether the time period exceeds a threshold. In some embodiments, the index manager 122 may retrieve a configured threshold. The threshold may be indicative of a maximum period of time before an indexer is removed from the status indication if a message is not received. This may enable the index manager 122 to dynamically update the status of the indexer to avoid having data collectors transmit data to indexers that are not responsive or capable of processing the data. If at block 328, the index manager 122 determines that the time period exceeds the threshold, the method 320 proceeds to block 330, where the index manager 122 may remove the indexer 116 from the status indication. This may enable the index manager 122 to dynamically update the status of the indexer to avoid having data collectors transmit data to indexers that are not responsive or capable of processing the data.

If at block 328, the index manager 122 determines that the time period does not exceed the threshold, the method 320 may proceed to block 332. At block 332, the index manager 122 may determine whether a new message has been received. If at block 332, the index manager 122 determines that a new message has not been received, the method 320 may proceed back to block 326. If at block 332, the index manager 122 determines that a new message has been received, the method 320 may proceed back to block 322.

Figure 3C:
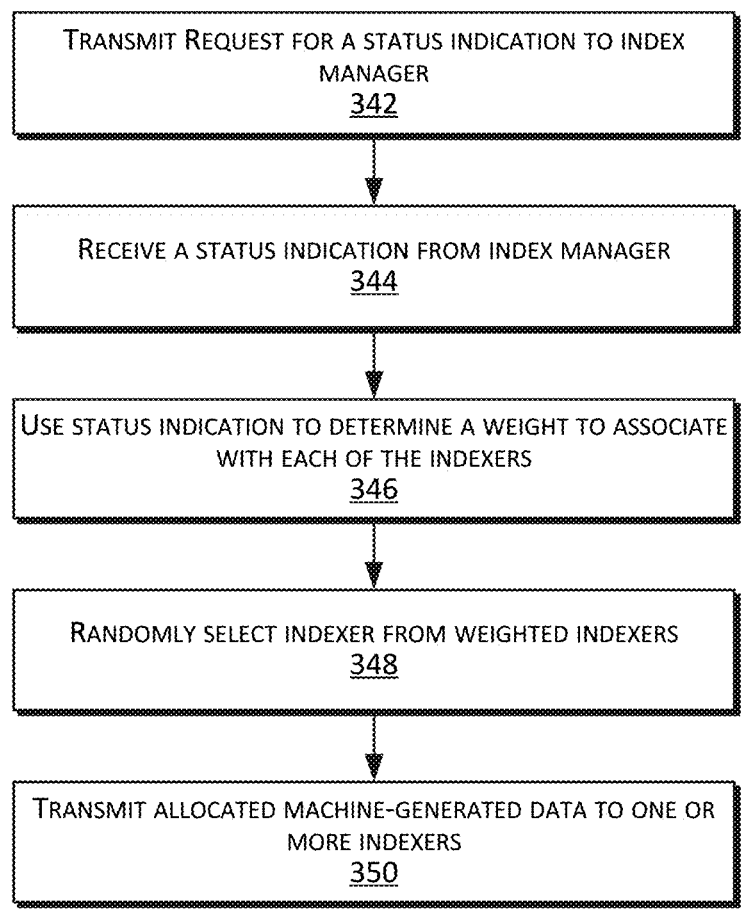
FIG. 3C is a flowchart that illustrates an example method for load balancing in a data collector of a system providing dynamic indexer discovery in accordance with the disclosed embodiments.

FIG. 3C is a flowchart that illustrates an example method 340 for load balancing in a data collector of a system providing dynamic indexer discovery in accordance with the disclosed embodiments. At block 342, the forwarder 114 may transmit a request for a status indication to the index manager 122. In some embodiments, the request may include additional information, such as a forwarder identifier and a site identifier associated with one or more data centers.

At block 344, the forwarder 114 may receive a status indication from the index manager 116. In some embodiments, the status indication may be received in response to a request 206 transmitted by the forwarder 114 to the index manager 122. In some embodiments, the index manager 122 may transmit a response or notification to the forwarder 114. The message or notification may include a copy of the status indication or may include a link to the status indication (e.g., table, directory, list, etc.) that may be maintained remotely, such as on a datastore 158. In some embodiments, the status indication may be a read-only copy of the status indication maintained by the index manager 122 to reduce the likelihood of data corruption.

At block 346, the forwarder 114 may use the status indication to determine a weight to associate with each of the indexers on the status indication. In one example embodiment, the forwarder 114 may determine a total capacity of all the indexers of the status indication. For example, the forwarder 114 may add each storage capacity associated with a respective indexer 116 identified on the status indication. The forwarder may then determine a weight to associate with each of the respective indexers 116 by using the storage capacity associated with the indexer, dividing that capacity by the total capacity it determined, and then multiplying the result by 100 to obtain a percentage. The percentage may then be associated with the respective indexer 116 and used as the weight associated with the indexer 116.

At block 348, the forwarder 114 may randomly select an indexer 116 from the weighted indexers. In some embodiments, the forwarder 114 may randomly select an indexer 116 at periodic intervals (e.g., every thirty seconds). In some embodiments, the forwarder 114 may use a methodology where indexers with greater weights will likely be more frequently selected. For example, if indexer A has a weight of about 50% and indexer B has a weight of about 25%, then indexer A will likely be selected twice as often as indexer B, resulting in indexer A receiving about twice as much data to process from the forwarder 114.

In some embodiments, the forwarder 114 may allocate received machine-generated data 204 to one or more indexers based at least in part on the status indication. In some embodiments, the forwarder 114 may analyze the data obtained from the status indication and may determine how to allocate received machine-generated data 204 to one or more indexers 116. For example, the forwarder 114 may determine that a first indexer has a relatively higher storage capacity than a second indexer and may transmit a relatively larger portion of data to the first indexer 116 than the second indexer 116. In other embodiments, the forwarder 114 may analyze one or more performance metrics, obtained via the status indication, to determine whether to send data to an indexer 116, and how much data to transmit for processing. In other words, based on the performance metrics of indexers, the forwarders 114 may more efficiently load balance transmission of the machine-generated data 204 to indexers 116. At block 350, the forwarder 114 may transmit the allocated machine-generated data 204 to the one or more indexers to process the machine-generated data 204.

Figure 3D:
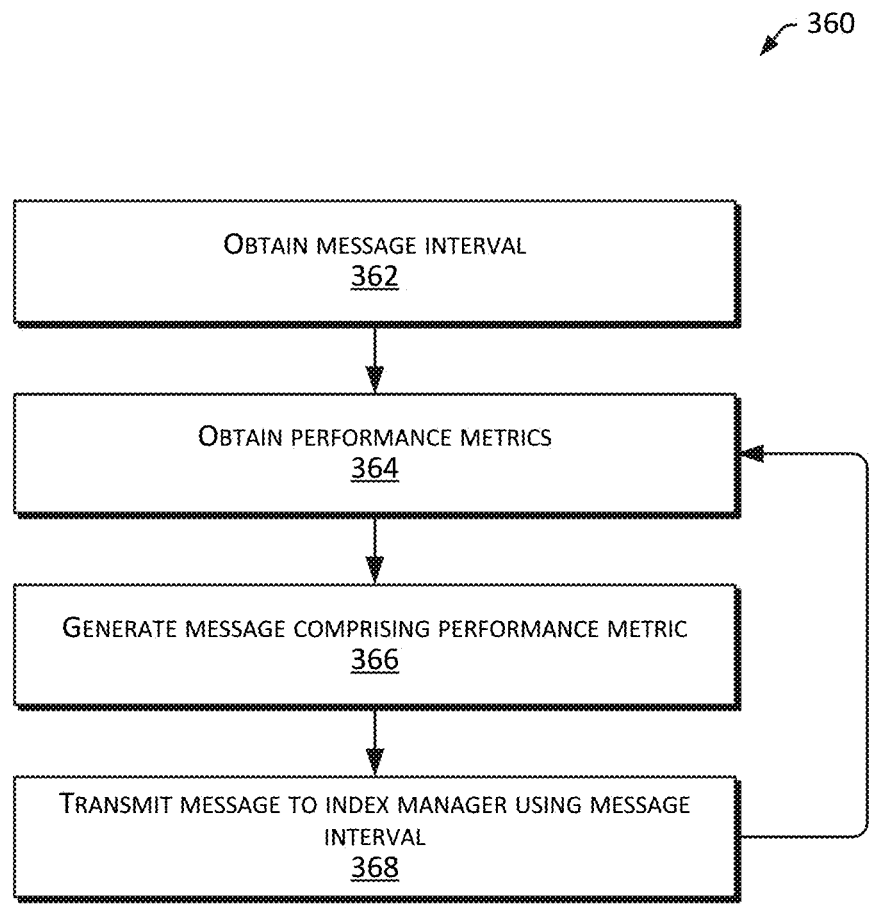
FIG. 3D is a flowchart that illustrates an example method for transmitting performance metrics from an indexer to an index manager in a system for providing dynamic indexer discovery in accordance with the disclosed embodiments.

FIG. 3D is a flowchart that illustrates an example method 360 for transmitting performance metrics from an indexer to an index manager in a system for providing dynamic indexer discovery in accordance with the disclosed embodiments. At block 362, an indexer 116 may obtain a message interval. A message interval may be known as a heartbeat interval. In some embodiments, the message interval may be a periodic time interval used by the indexer 116 to determine when to send status messages 202 to the index manager 122. In some embodiments, the message interval is manually configured. In some embodiments, if a message interval is not manually configured, the indexer 116 may utilize a default value designating the periodic interval for the message interval.

At block 364, the indexer 116 may obtain performance metrics. In some embodiments, the performance metrics may be information associated with the instance of the indexer 116 that may be retrieved, such as storage capacity, memory capacity, CPU capacity or the like. In some embodiments, the performance metrics may be calculated and locally maintained by the indexer 116. Examples of performance metrics may include, but are not limited to, whether the indexer 116 is SSL-enabled, average load metrics (e.g., average CPU consumption, average memory consumption, average disk utilization, average network utilization, etc.), and/or queue statistics (e.g., number of queues, how many searches have been performed, how full the queues are, how much data the indexer has processed in an identified time period, how quickly data is being written to disk, etc.).

At block 366, the indexer 116 may generate the status message 202 comprising indexer identifier information (e.g., IP address) and one or more performance metrics. At block 368, the indexer 116 may transmit the status message 202 to the index manager 122 using the message interval. In some embodiments, the indexer 116 may transmit the status message 202 to the index manager 122 over an HTTPS connection, In some embodiments, the status message 202 may be sent in a CSV format.

Figure 4:
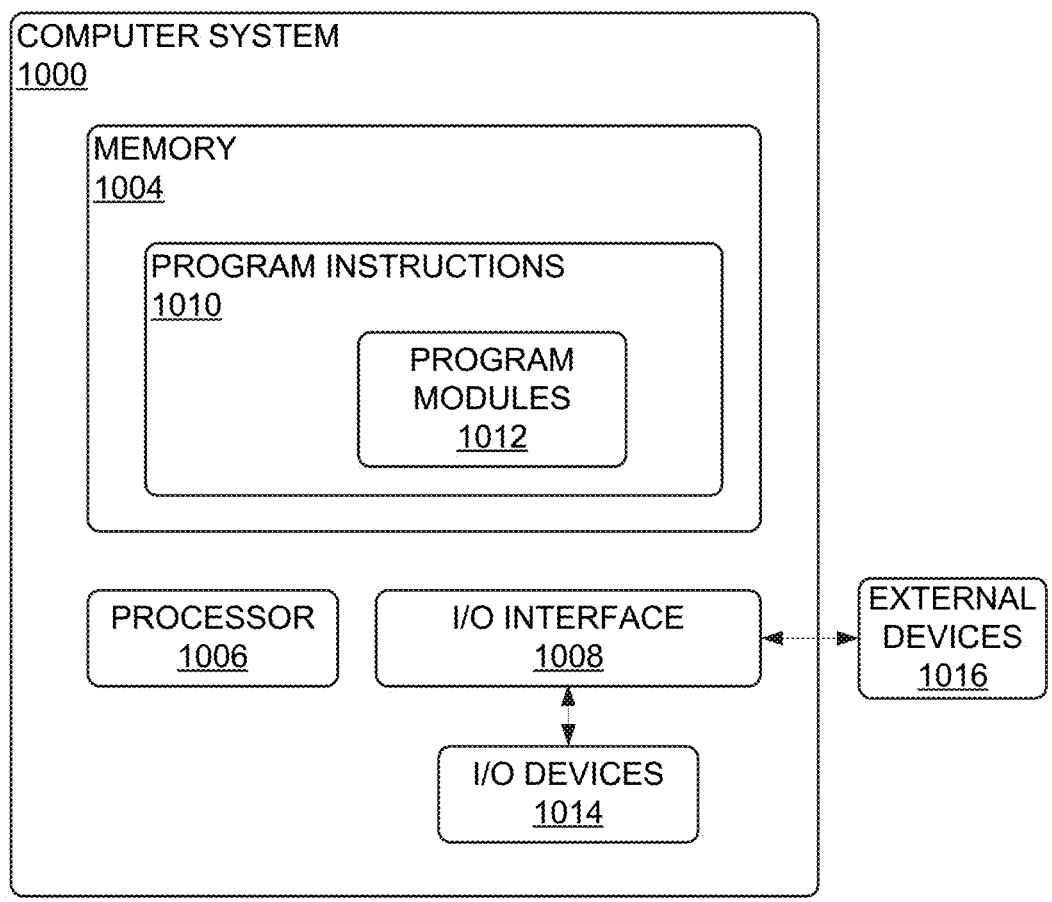
FIG. 4 is a diagram that illustrates an example computer system in accordance with the disclosed embodiments.

FIG. 4 is a diagram that illustrates an example computer system 1000 in accordance with one or more embodiments. In some embodiments, the computer system 1000 may include a memory 1004, a processor 1006, and an input/output (I/O) interface 1008. The memory 1004 may include non-volatile memory (e.g., flash memory, read-only memory (ROM), programmable read-only memory (PROM), erasable programmable read-only memory (EPROM), electrically erasable programmable read-only memory (EEPROM)), volatile memory (e.g., random access memory (RAM), static random access memory (SRAM), synchronous dynamic RAM (SDRAM)), bulk storage memory (e.g., CD-ROM and/or DVD-ROM, hard drives), and/or the like. The memory 1004 may include a non-transitory computer-readable storage medium having program instructions 1010 stored therein. The program instructions 1010 may include program modules 1012 that are executable by a computer processor (e.g., the processor 1006) to cause the functional operations described herein, including, for example, one or more of the methods 200 and/or 250. In the context of a computer system of the client device 106, the program modules 1012 may include one or more modules for performing some or all of the operations described with regard to the client device 106. In the context of a computer system of the application server 110, the program modules 1012 may include a one or more modules (e.g., the enterprise application module 140) for performing some or all of the operations described with regard to the application server 110 and/or the application 140.

The processor 1006 may be any suitable processor capable of executing/performing program instructions. The processor 1006 may include a central processing unit (CPU) that carries out program instructions (e.g., the program instructions of the program module(s) 1012) to perform the arithmetical, logical, and input/output operations described herein. The processor 1006 may include one or more processors. The I/O interface 1008 may provide an interface for communication with one or more I/O devices 1014, such as a joystick, a computer mouse, a keyboard, a display screen (e.g., an electronic display for displaying a graphical user interface (GUI)), and/or the like. The I/O devices 1014 may include one or more of the user input devices. The I/O devices 1014 may be connected to the I/O interface 1008 via a wired or a wireless connection. The I/O interface 1008 may provide an interface for communication with one or more external devices 1016, such as other computers, networks, and/or the like. In some embodiments, the I/O interface 1008 may include an antenna, transceiver, and/or the like.

Accordingly, certain disclosed embodiments for providing dynamic indexer discovery are described. As described herein, in some embodiments, an application program may receive machine-generated data and searches of the data that employ a late binding schema. An index manager may be in communication with active indexers and may obtain a current status associated with each of the indexers. The index manager may generate or maintain a status indication, such as a list or directory of active indexers. The index manager may transmit the status indication to requesting data collectors, such as forwarders. The data collectors may then determine, based on the status indication, one or more active indexers to forward or transmit machine-generated data obtained by the data collectors for indexing. Data indexed by the active indexers may be available to an application program for searching. Such a search may employ, for example, a late-binding schema to identify one or more event records of a set of indexed event records that each include a portion of raw-machine-generated data and are each time-stamped or otherwise associated with a particular time. At least the following sections describe an example data system that may employ the described embodiments, including employing one or more searches of machine-generated data that can be employed in conjunction with the above described techniques.

1.1 Overview of Example Performance Data System

Modern data centers often comprise thousands of host computer systems that operate collectively to service requests from even larger numbers of remote clients. During operation, these data centers generate significant volumes of performance data and diagnostic information that can be analyzed to quickly diagnose performance problems. In order to reduce the size of this performance data, the data is typically pre-processed prior to being stored based on anticipated data-analysis needs. For example, pre-specified data items can be extracted from the performance data and stored in a database to facilitate efficient retrieval and analysis at search time. However, the rest of the performance data is not saved and is essentially discarded during pre-processing. As storage capacity becomes progressively cheaper and more plentiful, there are fewer incentives to discard this performance data and many reasons to keep it.

This plentiful storage capacity is presently making it feasible to store massive quantities of minimally processed performance data at "ingestion time" for later retrieval and analysis at "search time." Note that performing the analysis operations at search time provides greater flexibility because it enables an analyst to search all of the performance data, instead of searching pre-specified data items that were stored at ingestion time. This enables the analyst to investigate different aspects of the performance data instead of being confined to the pre-specified set of data items that were selected at ingestion time.

However, analyzing massive quantities of heterogeneous performance data at search time can be a challenging task. A data center may generate heterogeneous performance data from thousands of different components, which can collectively generate tremendous volumes of performance data that can be time-consuming to analyze. For example, this performance data can include data from system logs, network packet data, sensor data, and data generated by various applications. Also, the unstructured nature of much of this performance data can pose additional challenges because of the difficulty of applying semantic meaning to unstructured data, and the difficulty of indexing and querying unstructured data using traditional database systems.

These challenges can be addressed by using an event-based system, such as the SPLUNK® ENTERPRISE system produced by Splunk Inc. of San Francisco, Calif., to store and process performance data. The SPLUNK® ENTERPRISE system is the leading platform for providing real-time operational intelligence that enables organizations to collect, index, and harness machine-generated data from various websites, applications, servers, networks, and mobile devices that power their businesses. The SPLUNK® ENTERPRISE system is particularly useful for analyzing unstructured performance data, which is commonly found in system log files. Although many of the techniques described herein are explained with reference to the SPLUNK® ENTERPRISE system, the techniques are also applicable to other types of data server systems.

In the SPLUNK® ENTERPRISE system, performance data is stored as "events," wherein each event comprises a collection of performance data and/or diagnostic information that is generated by a computer system and is correlated with a specific point in time. Events can be derived from "time series data," wherein time series data comprises a sequence of data points (e.g., performance measurements from a computer system) that are associated with successive points in time and are typically spaced at uniform time intervals. Events can also be derived from "structured" or "unstructured" data. Structured data has a predefined format, wherein specific data items with specific data formats reside at predefined locations in the data. For example, structured data can include data items stored in fields in a database table. In contrast, unstructured data does not have a predefined format. This means that unstructured data can comprise various data items having different data types that can reside at different locations. For example, when the data source is an operating system log, an event can include one or more lines from the operating system log containing raw data that can include different types of performance and diagnostic information associated with a specific point in time. Examples of data sources from which an event may be derived include, but are not limited to: web servers; application servers; databases; firewalls; routers; operating systems; and software applications that execute on computer systems, mobile devices, and sensors. The data generated by such data sources can be produced in various forms including, for example and without limitation, server log files, activity log files, configuration files, messages, network packet data, performance measurements, and sensor measurements. An event typically includes a timestamp that may be derived from the raw data in the event, or may be determined through interpolation between temporally proximate events having known timestamps.

The SPLUNK® ENTERPRISE system also facilitates using a flexible schema to specify how to extract information from the event data, wherein the flexible schema may be developed and redefined as needed. Note that a flexible schema may be applied to event data "on the fly," when it is needed (e.g., at search time), rather than at ingestion time of the data as in traditional database systems. Because the schema is not applied to event data until it is needed (e.g., at search time), it is referred to as a "late-binding schema."

During operation, the SPLUNK® ENTERPRISE system starts with raw data, which can include unstructured data, machine data, performance measurements or other time-series data, such as data obtained from weblogs, syslogs, or sensor readings. It divides this raw data into "portions," and optionally transforms the data to produce timestamped events. The system stores the timestamped events in a data store, and enables a user to run queries against the data store to retrieve events that meet specified criteria, such as containing certain keywords or having specific values in defined fields. Note that the term "field" refers to a location in the event data containing a value for a specific data item.

As noted above, the SPLUNK® ENTERPRISE system facilitates using a late-binding schema while performing queries on events. A late-binding schema specifies "extraction rules" that are applied to data in the events to extract values for specific fields. More specifically, the extraction rules for a field can include one or more instructions that specify how to extract a value for the field from the event data. An extraction rule can generally include any type of instruction for extracting values from data in events. In some cases, an extraction rule comprises a regular expression, in which case the rule is referred to as a "regex rule."

In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as an analyst learns more about the data in the events, the analyst can continue to refine the late-binding schema by adding new fields, deleting fields, or changing the field extraction rules until the next time the schema is used by a query. Because the SPLUNK® ENTERPRISE system maintains the underlying raw data and provides a late-binding schema for searching the raw data, it enables an analyst to investigate questions that arise as the analyst learns more about the events.

In the SPLUNK® ENTERPRISE system, a field extractor may be configured to automatically generate extraction rules for certain fields in the events when the events are being created, indexed, or stored, or possibly at a later time. Alternatively, a user may manually define extraction rules for fields using a variety of techniques.

Also, a number of "default fields" that specify metadata about the events rather than data in the events themselves can be created automatically. For example, such default fields can specify: a timestamp for the event data; a host from which the event data originated; a source of the event data; and a source type for the event data. These default fields may be determined automatically when the events are created, indexed or stored.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by different data sources, the system facilitates use of a "common information model" (CIM) across the different data sources.

1.2 Data Server System

Figure 5:
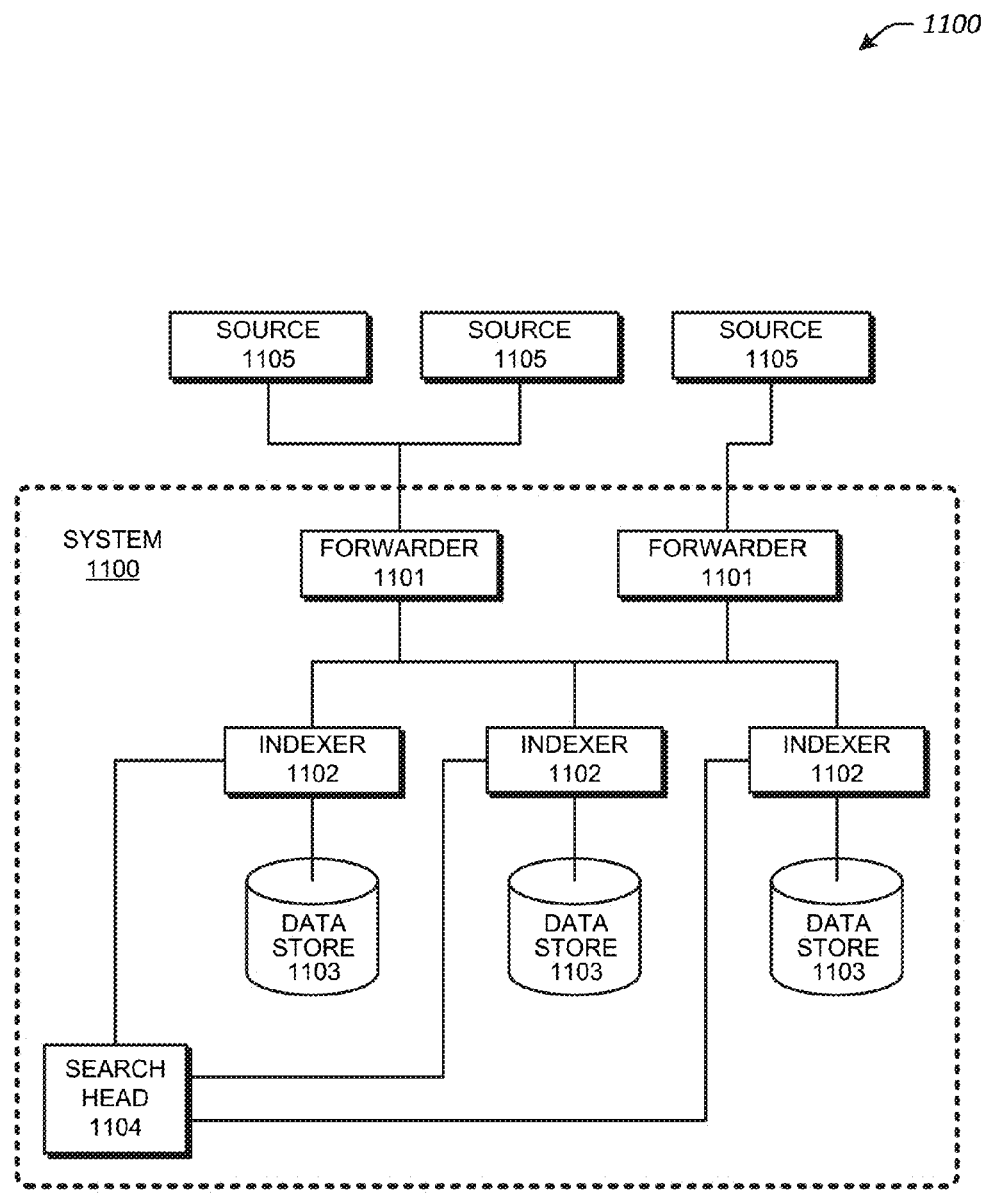
FIG. 5 presents a block diagram of an example event-processing system in accordance with the disclosed embodiments.

FIG. 5 presents a block diagram of an exemplary event-processing system 1100, similar to the SPLUNK® ENTERPRISE system. System 1100 includes one or more forwarders 1101 that collect data obtained from a variety of different data sources 1105, and one or more indexers 1102 that store, process, and/or perform operations on this data, wherein each indexer operates on data contained in a specific data store 1103. These forwarders and indexers can comprise separate computer systems in a data center, or may alternatively comprise separate processes executing on various computer systems in a data center.

During operation, the forwarders 1101 identify which indexers 1102 will receive the collected data and then forward the data to the identified indexers. Forwarders 1101 can also perform operations to strip out extraneous data and detect timestamps in the data. The forwarders 1101 next determine which indexers 1102 will receive each data item and then forward the data items to the determined indexers 1102.

Note that distributing data across different indexers facilitates parallel processing. This parallel processing can take place at data ingestion time, because multiple indexers can process the incoming data in parallel. The parallel processing can also take place at search time, because multiple indexers can search through the data in parallel.

System 1100 and the processes described below with respect to FIGS. 5-9 are further described in "Exploring Splunk Search Processing Language (SPL) Primer and Cookbook" by David Carasso, CITO Research, 2012, and in "Optimizing Data Analysis With a Semi-Structured Time Series Database" by Ledion Bitincka, Archana Ganapathi, Stephen Sorkin, and Steve Zhang, SLAML, 2010, each of which is hereby incorporated herein by reference in its entirety for all purposes.

1.3 Data Ingestion

Figure 6:
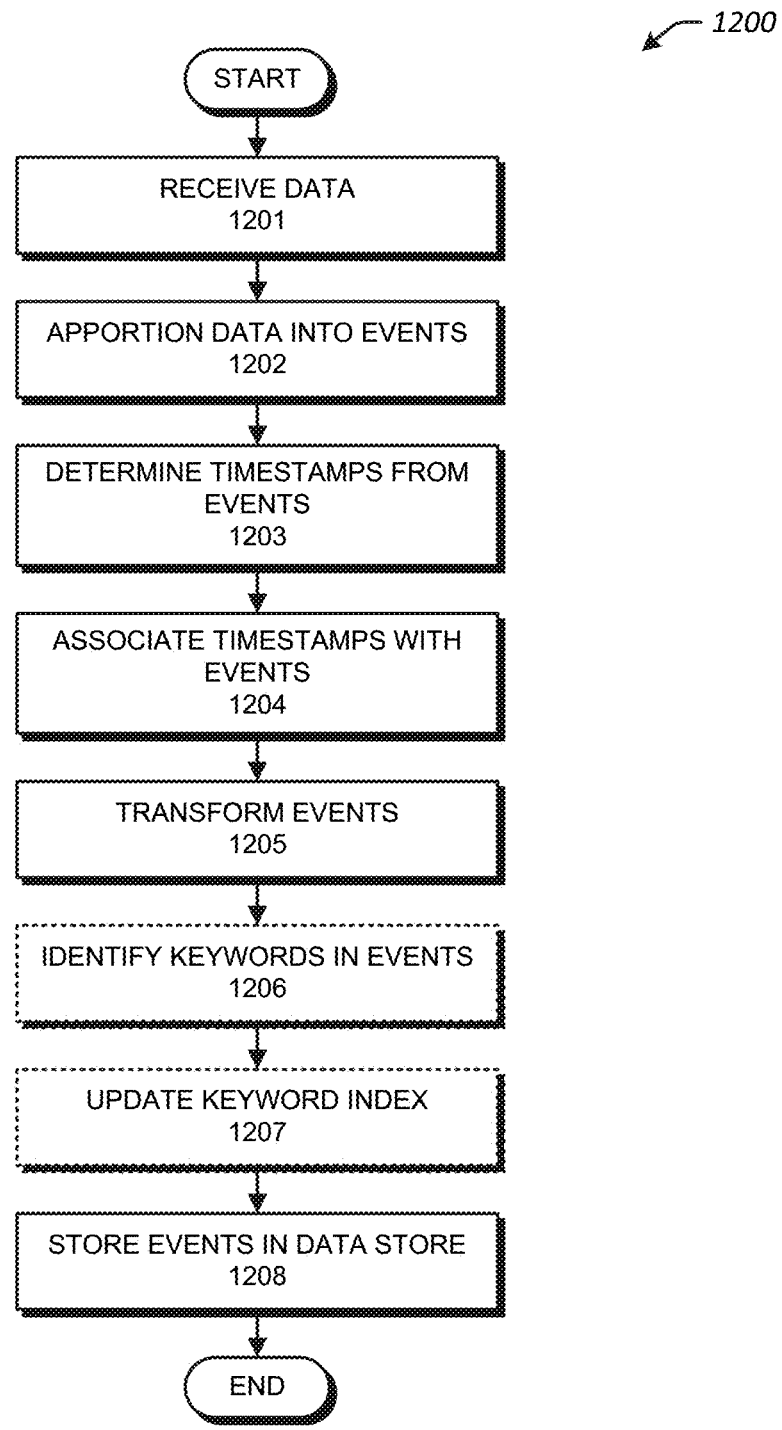
FIG. 6 presents a flowchart illustrating an example of how indexers process, index, and store data received from forwarders in accordance with the disclosed embodiments.

FIG. 6 presents a flowchart illustrating how an indexer processes, indexes, and stores data received from forwarders in accordance with the disclosed embodiments. At block 1201, the indexer receives the data from the forwarder. Next, at block 1202, the indexer apportions the data into events. Note that the data can include lines of text that are separated by carriage returns or line breaks, and an event may include one or more of these lines. During the apportioning process, the indexer can use heuristic rules to automatically determine the boundaries of the events, which for example coincide with line boundaries. These heuristic rules may be determined based on the source of the data, wherein the indexer can be explicitly informed about the source of the data or can infer the source of the data by examining the data. These heuristic rules can include regular expression-based rules or delimiter-based rules for determining event boundaries, wherein the event boundaries may be indicated by predefined characters or character strings. These predefined characters may include punctuation marks or other special characters including, for example, carriage returns, tabs, spaces, or line breaks. In some cases, a user can fine-tune or configure the rules that the indexers use to determine event boundaries in order to adapt the rules to the user's specific requirements.

Next, the indexer determines a timestamp for each event at block 1203. As mentioned above, these timestamps can be determined by extracting the time directly from the data in the event, or by interpolating the time based on timestamps from temporally proximate events. In some cases, a timestamp can be determined based on the time the data was received or generated. The indexer subsequently associates the determined timestamp with each event at block 1204, for example, by storing the timestamp as metadata for each event.

Then, the system can apply transformations to data to be included in events at block 1205. For log data, such transformations can include removing a portion of an event (e.g., a portion used to define event boundaries, extraneous text, characters, etc.) or removing redundant portions of an event. Note that a user can specify portions to be removed using a regular expression or any other possible technique.

Next, a keyword index can optionally be generated to facilitate fast keyword searching for events. To build a keyword index, the indexer first identifies a set of keywords in events in block 1206. Then, at block 1207 the indexer includes the identified keywords in an index, which associates each stored keyword with references to events containing that keyword (or to locations within events where that keyword is located). When an indexer subsequently receives a keyword-based query, the indexer can access the keyword index to quickly identify events containing the keyword.

In some embodiments, the keyword index may include entries for name-value pairs found in events, wherein a name-value pair can include a pair of keywords connected by a symbol, such as an equals sign or a colon. In this way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2."

Finally, the indexer stores the events in a data store at block 1208, wherein a timestamp can be stored with each event to facilitate searching for events based on a time range. In some cases, the stored events are organized into a plurality of buckets, wherein each bucket stores events associated with a specific time range. This not only improves time-based searches, but it also allows events with recent timestamps that may have a higher likelihood of being accessed to be stored in faster memory to facilitate faster retrieval. For example, a bucket containing the most recent events can be stored as flash memory instead of on hard disk.

Each indexer 1102 is responsible for storing and searching a subset of the events contained in a corresponding data store 1103. By distributing events among the indexers and data stores, the indexers can analyze events for a query in parallel, for example, using map-reduce techniques, wherein each indexer returns partial responses for a subset of events to a search head that combines the results to produce an answer for the query. By storing events in buckets for specific time ranges, an indexer may further optimize searching by looking only in buckets for time ranges that are relevant to a query.

Moreover, events and buckets can also be replicated across different indexers and data stores to facilitate high availability and disaster recovery as is described in U.S. patent application Ser. No. 14/266,812, filed on Apr. 30 2014, and in U.S. patent application Ser. No. 14/266,817, also filed on Apr. 30, 2014, which are hereby incorporated by reference.

1.4 Query Processing

Figure 7:
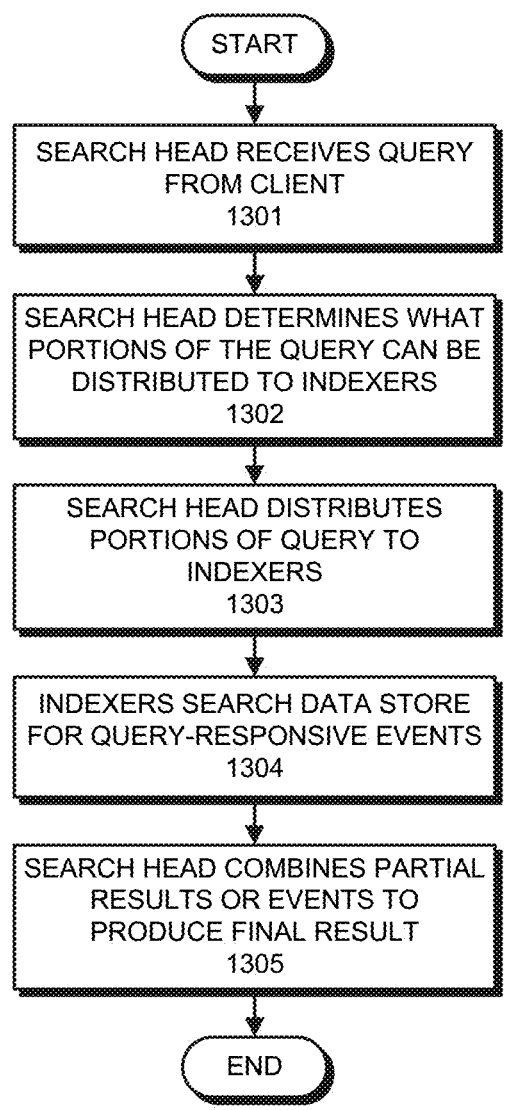
FIG. 7 presents a flowchart illustrating an example of how a search head and indexers perform a search query in accordance with the disclosed embodiments.

FIG. 7 presents a flowchart illustrating how a search head and indexers perform a search query in accordance with the disclosed embodiments. At the start of this process, a search head receives a search query from a client at block 1301. Next, at block 1302, the search head analyzes the search query to determine what portions can be delegated to indexers and what portions need to be executed locally by the search head. At block 1303, the search head distributes the determined portions of the query to the indexers. Note that commands that operate on single events can be trivially delegated to the indexers, while commands that involve events from multiple indexers are harder to delegate.

Then, at block 1304, the indexers to which the query was distributed search their data stores for events that are responsive to the query. To determine which events are responsive to the query, the indexer searches for events that match the criteria specified in the query. This criteria can include matching keywords or specific values for certain fields. In a query that uses a late-binding schema, the searching operations in block 1304 may involve using the late-binding scheme to extract values for specified fields from events at the time the query is processed. Next, the indexers can either send the relevant events back to the search head, or use the events to calculate a partial result, and send the partial result back to the search head.

Finally, at block 1305, the search head combines the partial results and/or events received from the indexers to produce a final result for the query. This final result can comprise different types of data depending upon what the query is asking for. For example, the final results can include a listing of matching events returned by the query, or some type of visualization of data from the returned events. In another example, the final result can include one or more calculated values derived from the matching events.

Moreover, the results generated by the system 1100 can be returned to a client using different techniques. For example, one technique streams results back to a client in real-time as they are identified. Another technique waits to report results to the client until a complete set of results is ready to return to the client. Yet another technique streams interim results back to the client in real-time until a complete set of results is ready, and then returns the complete set of results to the client. In another technique, certain results are stored as "search jobs," and the client may subsequently retrieve the results by referencing the search jobs.

The search head can also perform various operations to make the search more efficient. For example, before the search head starts executing a query, the search head can determine a time range for the query and a set of common keywords that all matching events must include. Next, the search head can use these settings to query the indexers to obtain a superset of the eventual results. Then, during a filtering stage, the search head can perform field-extraction operations on the superset to produce a reduced set of search results.

1.5 Field Extraction

Figure 8:
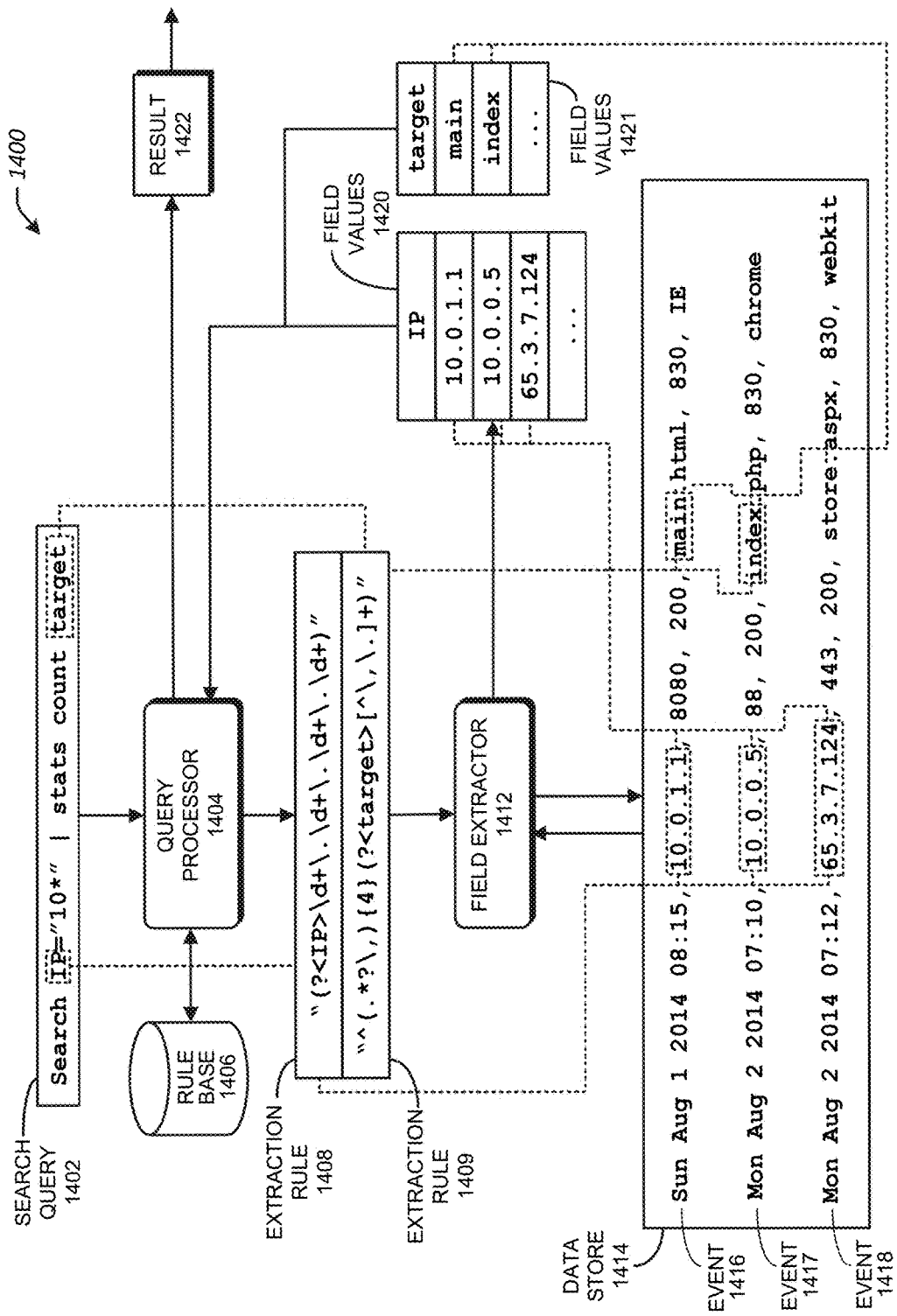
FIG. 8 presents a block diagram of an example system for processing search requests that uses extraction rules for field values in accordance with the disclosed embodiments.

FIG. 8 presents a block diagram illustrating how fields can be extracted during query processing in accordance with the disclosed embodiments. At the start of this process, a search query 1402 is received at a query processor 1404. Query processor 1404 includes various mechanisms for processing a query, wherein these mechanisms can reside in a search head 1104 and/or an indexer 1102. Note that the exemplary search query 1402 illustrated in FIG. 8 is expressed in Search Processing Language (SPL), which is used in conjunction with the SPLUNK® ENTERPRISE system. SPL is a pipelined search language in which a set of inputs is operated on by a first command in a command line, and then a subsequent command following the pipe symbol "|" operates on the results produced by the first command, and so on for additional commands. Search query 1402 can also be expressed in other query languages, such as the Structured Query Language (SQL) or any suitable query language.

Upon receiving search query 1402, query processor 1404 sees that search query 1402 includes two fields "IP" and "target." Query processor 1404 also determines that the values for the "IP" and "target" fields have not already been extracted from events in data store 1414, and consequently determines that query processor 1404 needs to use extraction rules to extract values for the fields. Hence, query processor 1404 performs a lookup for the extraction rules in a rule base 1406, wherein the rule base 1406 maps field names to corresponding extraction rules and obtains extraction rules 1408-1409, wherein extraction rule 1408 specifies how to extract a value for the "IP" field from an event, and extraction rule 1409 specifies how to extract a value for the "target" field from an event. As is illustrated in FIG. 8, extraction rules 1408-1409 can comprise regular expressions that specify how to extract values for the relevant fields. Such regular-expression-based extraction rules are also referred to as "regex rules." In addition to specifying how to extract field values, the extraction rules may also include instructions for deriving a field value by performing a function on a character string or a value retrieved by the extraction rule. For example, a transformation rule may truncate a character string, or convert the character string into a different data format. In some cases, the query itself can specify one or more extraction rules.

Next, query processor 1404 sends extraction rules 1408-1409 to a field extractor 1412, which applies extraction rules 1408-1409 to events 1416-1418 in a data store 1414. Note that data store 1414 can include one or more data stores, and extraction rules 1408-1409 can be applied to large numbers of events in data store 1414, and are not meant to be limited to the three events 1416-1418 illustrated in FIG. 8. Moreover, the query processor 1404 can instruct field extractor 1412 to apply the extraction rules to all of the events in a data store 1414, or to a subset of the events that have been filtered based on some criteria.

Next, field extractor 1412 applies extraction rule 1408 for the first command "Search IP="10*"" to events in data store 1414 including events 1416-1418. Extraction rule 1408 is used to extract values for the IP address field from events in data store 1414 by looking for a pattern of one or more digits, followed by a period, followed again by one or more digits, followed by another period, followed again by one or more digits, followed by another period, and followed again by one or more digits. Next, field extractor 1412 returns field values 1420 to query processor 1404, which uses the criterion IP="10*" to look for IP addresses that start with "10". Note that events 1416 and 1417 match this criterion, but event 1418 does not, so the result set for the first command is events 1416-1417.

Query processor 1404 then sends events 1416-1417 to the next command "stats count target." To process this command, query processor 1404 causes field extractor 1412 to apply extraction rule 1409 to events 1416-1417. Extraction rule 1409 is used to extract values for the target field for events 1416-1417 by skipping the first four commas in events 1416-1417, and then extracting all of the following characters until a comma or period is reached. Next, field extractor 1412 returns field values 1421 to query processor 1404, which executes the command "stats count target" to count the number of unique values contained in the target fields, which in this example produces the value "2" that is returned as a final result 1422 for the query.

Note that the query results can be returned to a client, a search head, or any other system component for further processing. In general, query results may include: a set of one or more events; a set of one or more values obtained from the events; a subset of the values; statistics calculated based on the values; a report containing the values; or a visualization, such as a graph or a chart, generated from the values.

1.6 Exemplary Search Screen

Figure 10A:
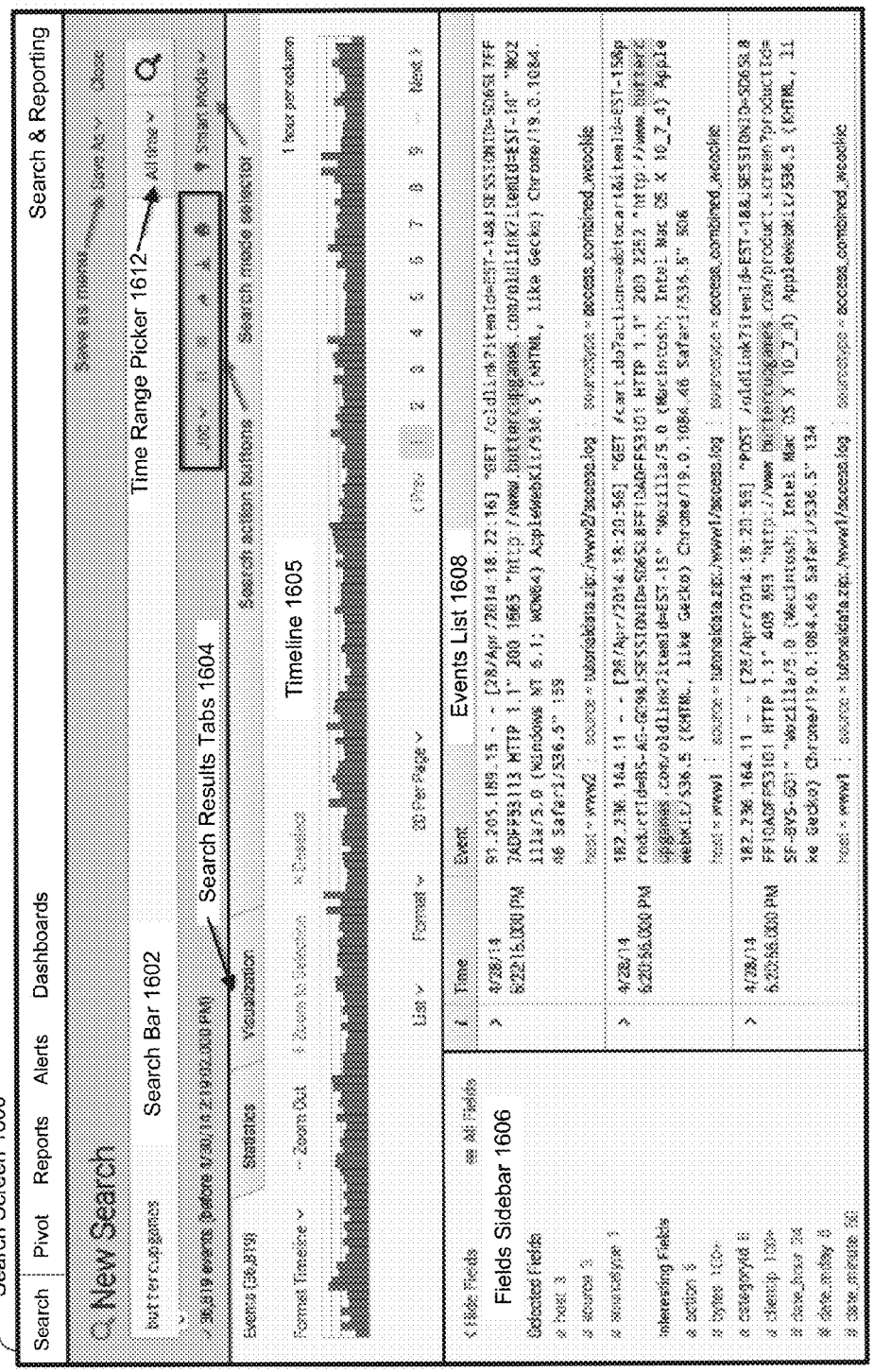
FIG. 10A illustrates an example search screen in accordance with the disclosed embodiments.
Figure 10B:
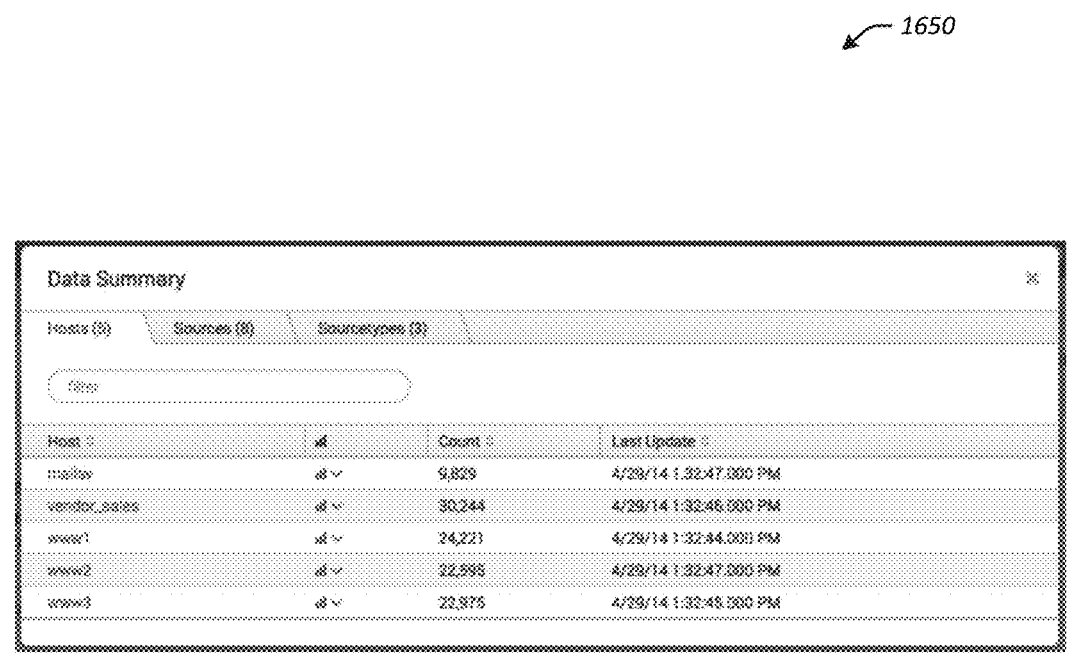

FIG. 10A illustrates an exemplary search screen 1600 in accordance with the disclosed embodiments. Search screen 1600 includes a search bar 1602 that accepts user input in the form of a search string. It also includes a time range picker 1612 that enables the user to specify a time range for the search. For "historical searches," the user can select a specific time range, or alternatively a relative time range, such as "today," "yesterday," or "last week." For "real-time searches," the user can select the size of a preceding time window to search for real-time events. Search screen 1600 also initially displays a "data summary" dialog as is illustrated in FIG. 10B that enables the user to select different sources for the event data, for example, by selecting specific hosts and log files.

After the search is executed, the search screen 1600 can display the results through search results tabs 1604, wherein search results tabs 1604 include: an "events tab" that displays various information about events returned by the search; a "statistics tab" that displays statistics about the search results; and a "visualization tab" that displays various visualizations of the search results. The events tab illustrated in FIG. 10A displays a timeline graph 1605 that graphically illustrates the number of events that occurred in one-hour intervals over the selected time range. It also displays an events list 1608 that enables a user to view the raw data in each of the returned events. It additionally displays a fields sidebar 1606 that includes statistics about occurrences of specific fields in the returned events, including "selected fields" that are pre-selected by the user, and "interesting fields" that are automatically selected by the system based on pre-specified criteria.

1.7 Acceleration Techniques

The above-described system provides significant flexibility by enabling a user to analyze massive quantities of minimally processed performance data "on the fly" at search time instead of storing pre-specified portions of the performance data in a database at ingestion time. This flexibility enables a user to see correlations in the performance data and perform subsequent queries to examine interesting aspects of the performance data that may not have been apparent at ingestion time.

However, performing extraction and analysis operations at search time can involve a large amount of data and require a large number of computational operations, which can cause considerable delays while processing the queries. Fortunately, a number of acceleration techniques have been developed to speed up analysis operations performed at search time. These techniques include: (1) performing search operations in parallel by formulating a search as a map-reduce computation; (2) using a keyword index; (3) using a high performance analytics store; and (4) accelerating the process of generating reports. These techniques are described in more detail below.

1.7.1 Map-Reduce Technique

To facilitate faster query processing, a query can be structured as a map-reduce computation, wherein the "map" operations are delegated to the indexers, while the corresponding "reduce" operations are performed locally at the search head. For example, FIG. 9 illustrates how a search query 1501 received from a client at search head 1104 can split into two phases, including: (1) a "map phase" comprising subtasks 1502 (e.g., data retrieval or simple filtering) that may be performed in parallel and are "mapped" to indexers 1102 for execution, and (2) a "reduce phase" comprising a merging operation 1503 to be executed by the search head when the results are ultimately collected from the indexers.

During operation, upon receiving search query 1501, search head 1104 modifies search query 1501 by substituting "stats" with "prestats" to produce search query 1502, and then distributes search query 1502 to one or more distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as is illustrated in FIG. 5, or may alternatively distribute a modified version (e.g., a more restricted version) of the search query to the search peers. In this example, the indexers are responsible for producing the results and sending them to the search head. After the indexers return the results to the search head, the search head performs the merging operations 1503 on the results. Note that by executing the computation in this way, the system effectively distributes the computational operations while minimizing data transfers.

1.7.2 Keyword Index

As described above with reference to the flowcharts in FIGS. 6 and 7, the event-processing system 1100 can construct and maintain one or more keyword indices to facilitate rapidly identifying events containing specific keywords. This can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

1.7.3 High Performance Analytics Store

To speed up certain types of queries, some embodiments of the system 1100 make use of a high performance analytics store, which is referred to as a "summarization table," that contains entries for specific field-value pairs. Each of these entries keeps track of instances of a specific value in a specific field in the event data and includes references to events containing the specific value in the specific field. For example, an exemplary entry in a summarization table can keep track of occurrences of the value "94107" in a "ZIP code" field of a set of events, wherein the entry includes references to all of the events that contain the value "94107" in the ZIP code field. This enables the system to quickly process queries that seek to determine how many events have a particular value for a particular field, because the system can examine the entry in the summarization table to count instances of the specific value in the field without having to go through the individual events or do extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range, wherein a bucket-specific summarization table includes entries for specific field-value combinations that occur in events in the specific bucket. Alternatively, the system can maintain a separate summarization table for each indexer, wherein the indexer-specific summarization table only includes entries for the events in a data store that is managed by the specific indexer.

The summarization table can be populated by running a "collection query" that scans a set of events to find instances of a specific field-value combination, or alternatively instances of all field-value combinations for a specific field. A collection query can be initiated by a user, or can be scheduled to occur automatically at specific time intervals. A collection query can also be automatically launched in response to a query that asks for a specific field-value combination.

In some cases, the summarization tables may not cover all of the events that are relevant to a query. In this case, the system can use the summarization tables to obtain partial results for the events that are covered by summarization tables, but may also have to search through other events that are not covered by the summarization tables to produce additional results. These additional results can then be combined with the partial results to produce a final set of results for the query. This summarization table and associated techniques are described in more detail in U.S. Pat. No. 8,682,925, issued on Mar. 25, 2014, which is hereby incorporated by reference.

1.7.4 Accelerating Report Generation

In some embodiments, a data server system such as the SPLUNK® ENTERPRISE system can accelerate the process of periodically generating updated reports based on query results. To accelerate this process, a summarization engine automatically examines the query to determine whether the generation of updated reports can be accelerated by creating intermediate summaries. (This is possible if results from preceding time periods can be computed separately and combined to generate an updated report. In some cases, it is not possible to combine such incremental results, for example, where a value in the report depends on relationships between events from different time periods.) If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that matches the specified criteria.

In parallel with the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so only the newer event data needs to be processed while generating an updated report. These report acceleration techniques are described in more detail in U.S. Pat. No. 8,589,403, issued on Nov. 19, 2013, and U.S. Pat. No. 8,412,696, issued on Apr. 2, 2011, which are hereby incorporated by reference.

1.8 Security Features

The SPLUNK® ENTERPRISE platform provides various schemas, dashboards, and visualizations that make it easy for developers to create applications to provide additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. This differs significantly from conventional Security Information and Event Management (SIEM) systems that lack the infrastructure to effectively store and analyze large volumes of security-related event data. Traditional SIEM systems typically use fixed schemas to extract data from pre-defined security-related fields at data ingestion time, wherein the extracted data is typically stored in a relational database. This data extraction process (and associated reduction in data size) that occurs at data ingestion time inevitably hampers future incident investigations, when all of the original data may be needed to determine the root cause of a security issue, or to detect the tiny fingerprints of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data, and also enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volumes, uniform resource locator strings, and source addresses. The process of detecting security threats for network-related information is further described in U.S. patent application Ser. Nos. 13/956,252, and 13/956,262, which are hereby incorporated by reference. Security-related information can also include endpoint information, such as malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting so-called "notable events" that are likely to indicate a security threat. These notable events can be detected in a number of ways: (1) an analyst can notice a correlation in the data and can manually identify a corresponding group of one or more events as "notable;" or (2) an analyst can define a "correlation search" specifying criteria for a notable event, and every time one or more events satisfy the criteria, the application can indicate that the one or more events are notable. An analyst can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 11A:
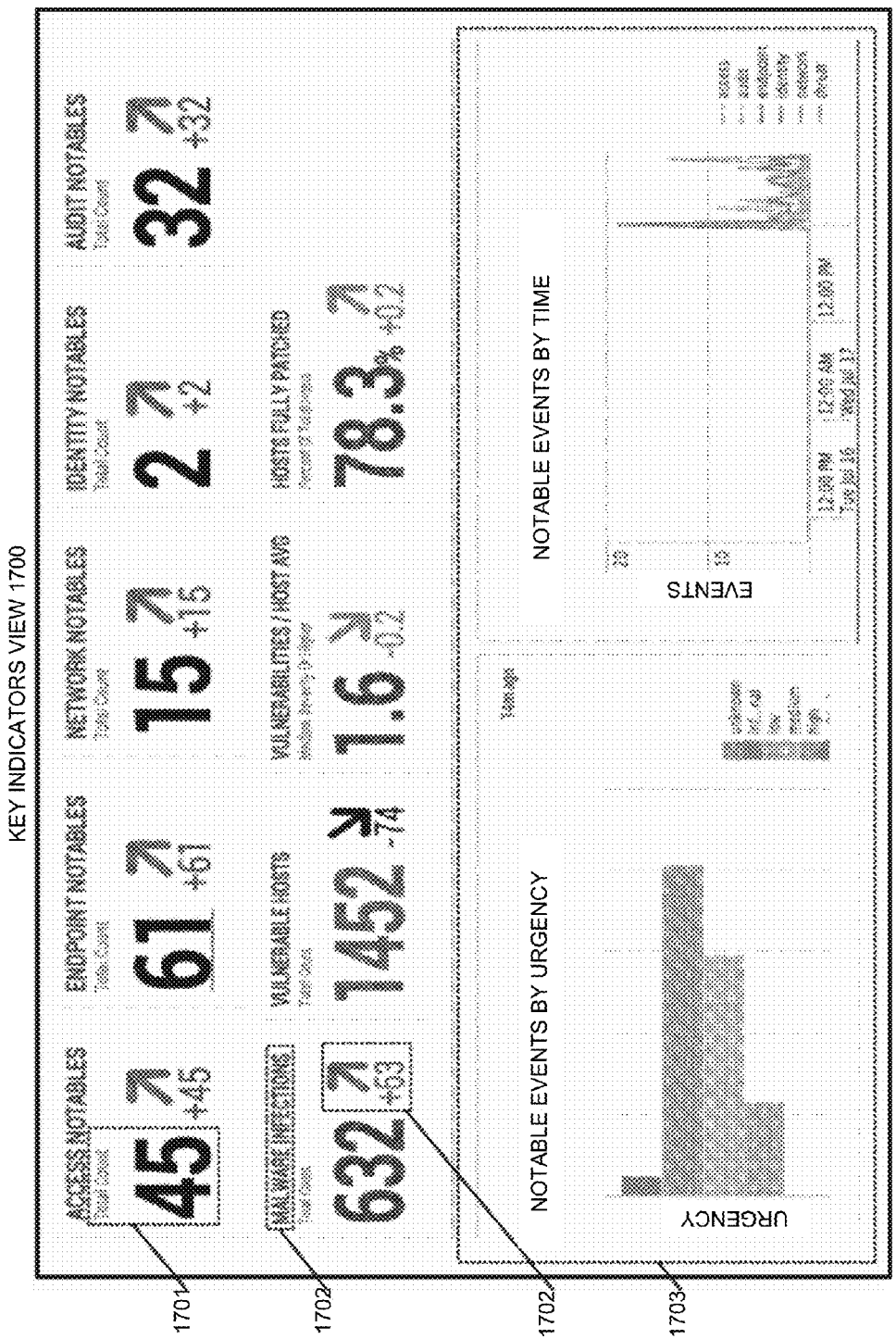
FIG. 11A illustrates an example key indicators view in accordance with the disclosed embodiments.

The SPLUNK® APP FOR ENTERPRISE SECURITY provides various visualizations to aid in discovering security threats, such as a "key indicators view" that enables a user to view security metrics of interest, such as counts of different types of notable events. For example, FIG. 11A illustrates an exemplary key indicators view 1700 that comprises a dashboard, which can display a value 1701, for various security-related metrics, such as malware infections 1702. It can also display a change in a metric value 1703, which indicates that the number of malware infections increased by 63 during the preceding interval. Key indicators view 1700 additionally displays a histogram panel 1704 that displays a histogram of notable events organized by urgency values, and a histogram of notable events organized by time intervals. This key indicators view is described in further detail in pending U.S. patent application Ser. No. 13/956,338, filed Jul. 31, 2013, which is hereby incorporated by reference.

Figure 11B:
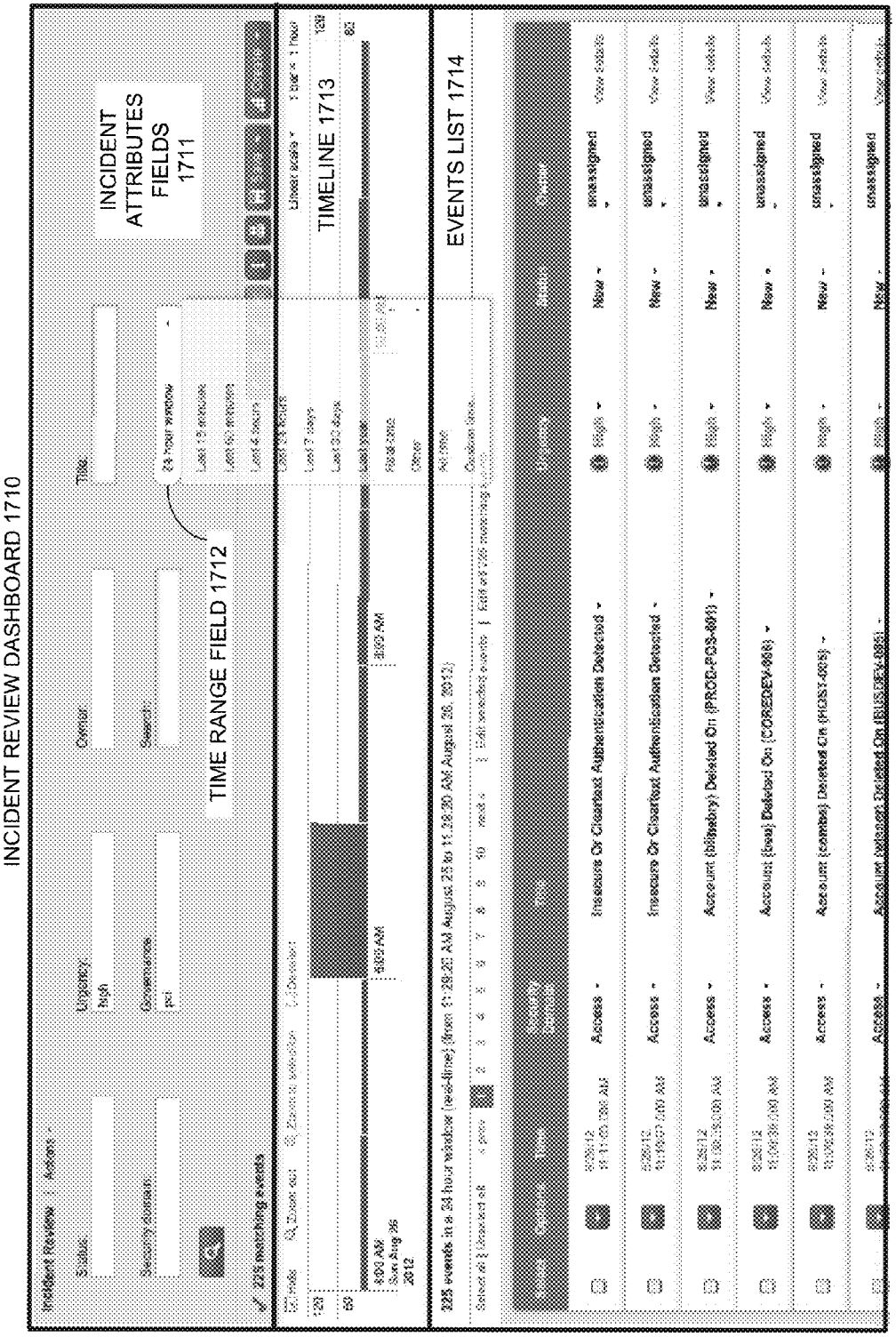
FIG. 11B illustrates an example incident review dashboard in accordance with the disclosed embodiments.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 11B illustrates an exemplary incident review dashboard 1710 that includes a set of incident attribute fields 1711 that, for example, enables a user to specify a time range field 1712 for the displayed events. It also includes a timeline 1713 that graphically illustrates the number of incidents that occurred in one-hour time intervals over the selected time range. It additionally displays an events list 1714 that enables a user to view a list of all of the notable events that match the criteria in the incident attributes fields 1711. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event. The incident review dashboard is described further in "http://docs.splunk.com/Documentation/PCI/2.1.1/User/IncidentReviewdashboard."

1.9 Data Center Monitoring

As mentioned above, the SPLUNK® ENTERPRISE platform provides various features that make it easy for developers to create various applications. One such application is the SPLUNK® APP FOR VMWARE®, which performs monitoring operations and includes analytics to facilitate diagnosing the root cause of performance problems in a data center based on large volumes of data stored by the SPLUNK® ENTERPRISE system.

This differs from conventional data-center-monitoring systems that lack the infrastructure to effectively store and analyze large volumes of performance information and log data obtained from the data center. In conventional data-center-monitoring systems, this performance data is typically pre-processed prior to being stored, for example, by extracting pre-specified data items from the performance data and storing them in a database to facilitate subsequent retrieval and analysis at search time. However, the rest of the performance data is not saved and is essentially discarded during pre-processing. In contrast, the SPLUNK® APP FOR VMWARE® stores large volumes of minimally processed performance information and log data at ingestion time for later retrieval and analysis at search time when a live performance issue is being investigated.

The SPLUNK® APP FOR VMWARE® can process many types of performance-related information. In general, this performance-related information can include any type of performance-related data and log data produced by virtual machines and host computer systems in a data center. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. For more details about such performance metrics, please see U.S. patent Ser. No. 14/167,316 filed Jan. 29, 2014, which is hereby incorporated herein by reference. Also, see "vSphere Monitoring and Performance," Update 1, vSphere 5.5, EN-001357-00, http://pubs.vmware.com/vsphere-55/topic/com.vmware.ICbase/PDF/vsphere-esxi-vcenter-server-551-monitoring-performance-guide.pdf.

To facilitate retrieving information of interest from performance data and log files, the SPLUNK® APP FOR VMWARE® provides pre-specified schemas for extracting relevant values from different types of performance-related event data, and also enables a user to define such schemas.

Figure 11C:
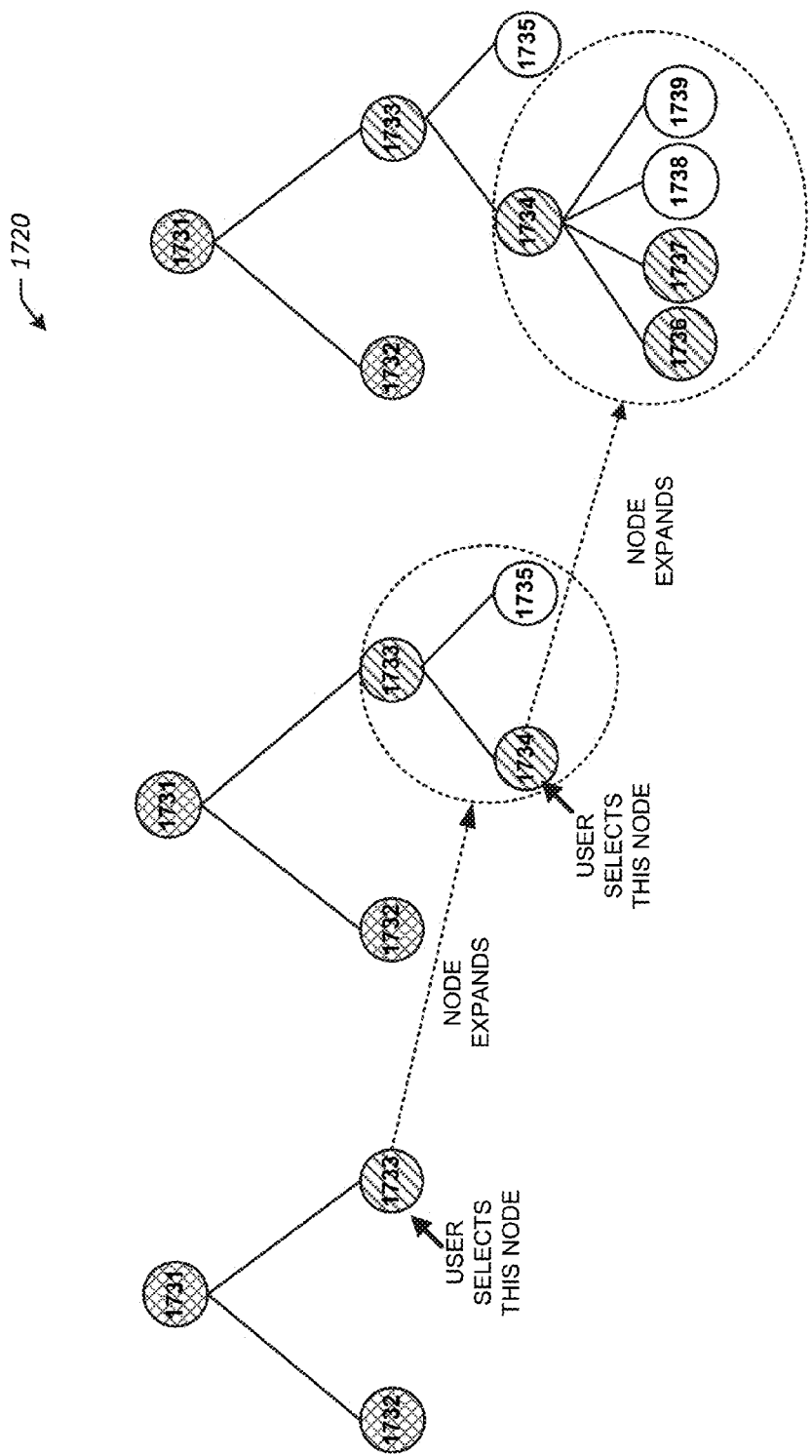
FIG. 11C illustrates an example proactive monitoring tree in accordance with the disclosed embodiments.
Figure 11D:
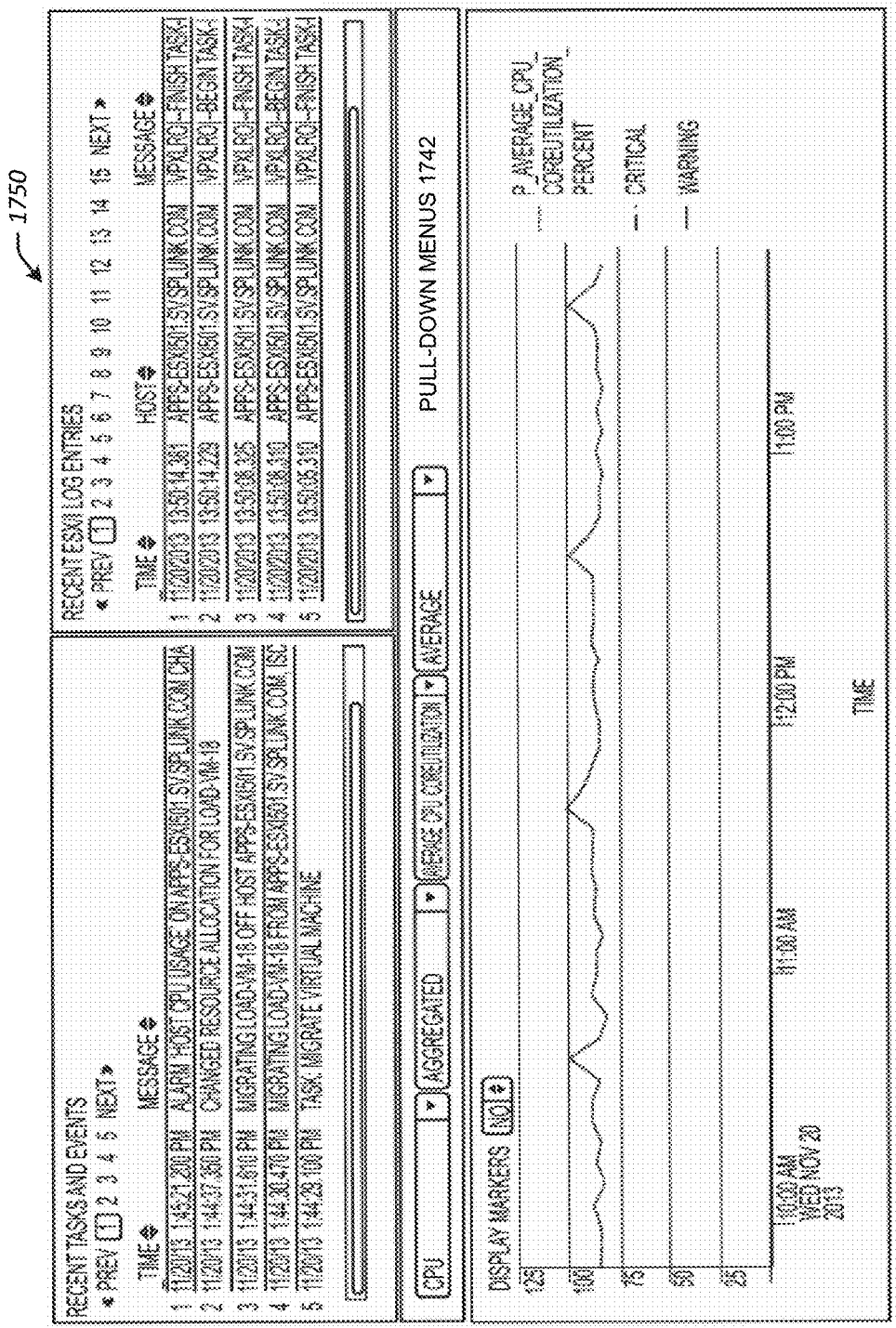
FIG. 11D illustrates an example screen displaying both log data and performance data in accordance with the disclosed embodiments.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Exemplary node-expansion operations are illustrated in FIG. 11C, wherein nodes 1733 and 1734 are selectively expanded. Note that nodes 1731-1739 can be displayed using different patterns or colors to represent different performance states, such as a critical state, a warning state, a normal state, or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/235,490, filed on Apr. 15, 2014, which is hereby incorporated by reference.

The SPLUNK® APP FOR VMWARE® also provides a user interface that enables a user to select a specific time range and then view heterogeneous data, comprising events, log data and associated performance metrics, for the selected time range. For example, the screen illustrated in FIG. 11D displays a listing of recent "tasks and events" and a listing of recent "log entries" for a selected time range above a performance-metric graph for "average CPU core utilization" for the selected time range. Note that a user is able to operate pull-down menus 1742 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316, filed on Jan. 29, 2014, which is hereby incorporated by reference.

Further modifications and embodiments of various aspects of the disclosure will be apparent to those skilled in the art in view of this description. Accordingly, this description is to be construed as illustrative only and is for the purpose of teaching those skilled in the art the general manner of carrying out the disclosure. It is to be understood that the forms of the disclosure shown and described herein are to be taken as examples of embodiments. Elements and materials may be substituted for those illustrated and described herein, parts and processes may be reversed or omitted, and certain features of the disclosure may be utilized independently, all as would be apparent to one skilled in the art after having the benefit of this description of the disclosure. Changes may be made in the elements described herein without departing from the spirit and scope of the disclosure as described in the following claims. Headings used herein are for organizational purposes only and are not meant to be used to limit the scope of the description.

It will be appreciated that the methods described are example embodiments of methods that may be employed in accordance with the techniques described herein. The methods may be modified to facilitate variations of their implementation and use. The order of the methods and the operations provided therein may be changed, and various elements may be added, reordered, combined, omitted, modified, etc. Portions of the methods may be implemented in software, hardware, or a combination thereof. Some or all of the portions of the methods may be implemented by one or more of the processors/modules/applications described herein.

As used throughout this application, the word "may" is used in a permissive sense (i.e., meaning having the potential to), rather than the mandatory sense (i.e., meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the phrase "based on" does not limit the associated operation to being solely based on a particular item. Thus, for example, processing "based on" data A may include processing based at least in part on data A and based at least in part on data B unless the content clearly indicates otherwise. Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

What is claimed is:

1. A method comprising:

maintaining, by an index manager, a status indication associated with a plurality of indexers, wherein each of the plurality of indexers indexes events of raw machine-generated data received from a plurality of data collectors;

receiving, by the index manager from a data collector of the plurality of data collectors, a request for the status indication associated with the plurality of indexers, wherein the index manager is in communication with one or more of data collectors, and wherein information in the status indication informs the data collector how to determine an allocation of the raw-machine generated data to transmit to the plurality of indexers, and wherein the data collector is operable to determine a manner in which to allocate the raw-machine generated data to the plurality of indexers based on the status indication; and transmitting, by the index manager, the status indication to the data collector responsive to the request.

2. The method of claim 1, further comprising:

receiving, by the index manager from a first indexer of the plurality of indexers, a first message indicating a first status of the first indexer and a first performance metric associated with the first indexer;

receiving, by the index manager from a second indexer of the plurality of indexers, a second message indicating a second status of the second indexer and a second performance metric associated with the second indexer;

generating, by the index manager, the status indication based on the first message and the second message; and transmitting, by the index manager to the data collector in response to the request, the status indication, and wherein information in the status indication informs the data collector how to determine an allocation of the raw-machine generated data to transmit to the first indexer or the second indexer.

3. The method of claim 1, further comprising:

determining, by the index manager, that a message has not been received from an indexer for a period of time;

determining, by the index manager, that the period of time is greater than a configured threshold, wherein the threshold indicates a maximum period of time before an identified indexer is removed from the status indication; and removing, by the index manager, the indexer from the status indication.

4. The method of claim 1, further comprising:

transmitting, by the index manager, the status indication to the plurality of data collectors at periodic time intervals, wherein the periodic time intervals are configurable.

5. The method of claim 1, further comprising:

transmitting, by the index manager, a notification to the first indexer to transmit status indication messages to the index manager at a pre-determined time.

6. The method of claim 1, further comprising:

transmitting, by the index manager, a first notification to the data collector specifying a first time interval for the data collector to request the status indication; and transmitting, by the index manager, a second notification to a second data collector specifying a second time interval for the second data collector to request the status indication, wherein the first time interval differs from the second time interval.

7. The method of claim 1, wherein the status indication comprises a first performance metric of a first indexer and a second performance metric of a second indexer, and wherein the data collector is configured to use the first performance metric and the second performance metric from the status indication to inform the data collector how to determine an allocation of the raw-machine generated data to transmit to the first indexer and a second portion of the raw machine-generated data to the second indexer.

8. The method of claim 1, wherein the data collector is configured to receive the status indication from the index manager and does not require reinitializing the data collector to use the status indication.

9. The method of claim 1, wherein each of the plurality of indexers are configured to transmit a respective message comprising a respective status and a respective performance metric at periodic time intervals, wherein the periodic time intervals are configurable.

10. The method of claim 1, wherein each of the plurality of indexers are configured to transmit a respective message comprising a respective status and a respective performance metric at a respective pre-determined time.

11. The method of claim 1, wherein the data collector is configured to identify a first performance metric from the status indication and based on the first performance metric, determine a first portion of the raw-machine generated data to transmit to the first indexer.

12. The method of claim 1, wherein the status indication comprises a first performance metric and a second performance metric associated with an indexer.

13. The method of claim 1, wherein the events of raw machine-generated data are obtained from at least one of activity logs, error logs, configuration files, network packets, application data, virtual machine data, or database records.

14. The method of claim 1, wherein the events of raw machine-generated data are each associated with a respective time stamp.

15. The method of claim 1, wherein the events of raw machine-generated data are field values extracted using one or more extraction rules of a late-binding schema performed at a search time.

16. The method of claim 1, wherein the events of raw machine-generated data comprise aggregated heterogeneous machine-generated data generated by at least one of a server, a database, an application, or a network.

17. The method of claim 1, wherein the events are extracted from raw machine-generated data based at least in part on a real-time search query.

18. The method of claim 1, further comprising:

transmitting, by the index manager, the status indication to the plurality of indexers at periodic time intervals, wherein the periodic time intervals are configurable.

19. A non-transitory computer-readable medium storing computer-executable instructions which, when executed by a processor, cause the processor to perform operations comprising:

transmitting, to an index manager, a request for a status indication associated with a plurality of indexers, wherein each of the plurality of indexers indexes events of raw machine- generated data received from a plurality of data collectors;

receiving, from the index manager in response to the request, the status indication associated with the plurality of indexers;

selecting an indexer from the plurality of indexers associated with each of the plurality of indexers; and transmitting data to the indexer, and using information in the status indication to determine an allocation of the raw-machine generated data to transmit to the indexer.

20. The non-transitory computer-readable medium of claim 19, wherein the events of raw machine-generated data are each associated with a respective time stamp.

21. The non-transitory computer-readable medium of claim 19, wherein the operations further comprise:
determining a total value associated with the plurality of indexers; and
determining a weight associated with the indexer by using a value of a performance metric of the indexer and the total value associated with the plurality of indexers.

22. The non-transitory computer-readable medium of claim 19, wherein the request comprises a data collector identifier and a site identifier.

23. The non-transitory computer-readable medium of claim 19, wherein the operations further comprise:
serializing the data; and
transmitting serialized data via JavaScript Objection Notation (JSON).

24. The non-transitory computer-readable medium of claim 19, wherein the operations further comprise:
adjusting, based at least in part on the status indication, an amount of data to transmit to the indexer.

25. A non-transitory computer-readable medium storing computer-executable instructions which, when executed by a processor, cause the processor to perform operations comprising:
maintaining a status indication associated with a plurality of indexers, wherein each of the plurality of indexers indexes events of raw machine-generated data received from a plurality of data collectors;
receiving, from a data collector of the plurality of data collectors, a request for the status indication; and
transmitting the status indication to the data collector responsive to the request, and wherein information in the status indication informs the data collector how to determine an allocation of the raw-machine generated data to transmit to the plurality of indexers, and further wherein the data collector is operable to determine a manner in which to allocate the raw-machine generated data to the plurality of indexers based on the status indication.

26. The non-transitory computer-readable medium of claim 25, wherein each of the plurality of indexers are configured to transmit a respective message comprising a respective status and a respective performance metric at periodic time intervals, wherein the periodic time intervals are configurable.

27. The non-transitory computer-readable medium of claim 25, wherein each of the plurality of indexers are configured to transmit a respective message comprising a respective status and a respective performance metric at a respective pre-determined time.

28. The non-transitory computer-readable medium of claim 25, wherein the data collector is configured to identify the first performance metric from the status indication and based on the first performance metric, determine to transmit a first portion of the raw machine-generated data to the first indexer.

29. The non-transitory computer-readable medium of claim 25, wherein the status indication comprises the first performance metric and the second performance metric.

30. A system comprising:
one or more processors; and
one or more memories comprising program instructions stored thereon that are executable by the one or more processors to cause:
maintaining, by an index manager, a status indication associated with a plurality of indexers, wherein each of the plurality of indexers indexes events of raw machine-generated data received from a plurality of data collectors;
receiving, by the index manager from a data collector of the plurality of data collectors, a request for the status indication associated with the plurality of indexes, wherein the index manager is in communication with one or more of data collectors; and
transmitting, by the index manager, the status indication to the data collector responsive to the request, and wherein information in the status indication informs the data collector how to determine an allocation of the raw-machine generated data to transmit to the plurality of indexers, and further wherein the data collector is operable to determine a manner in which to allocate the raw-machine generated data to the plurality of indexers based on the status indication.

* * * * *